(12) United States Patent
Levy et al.

(10) Patent No.: US 9,121,168 B2
(45) Date of Patent: Sep. 1, 2015

(54) MODULAR HOUSING

(75) Inventors: Jared Levy, Los Angeles, CA (US);
Gordon Stott, Los Angeles, CA (US)

(73) Assignee: Home Ec., Los Angeles, CA (US)

( * ) Notice: Subject to any disclaimer, the term of this patent is extended or adjusted under 35 U.S.C. 154(b) by 587 days.

(21) Appl. No.: 12/985,514

(22) Filed: Jan. 6, 2011

(65) Prior Publication Data

US 2011/0162293 A1    Jul. 7, 2011

Related U.S. Application Data

(60) Provisional application No. 61/292,630, filed on Jan. 6, 2010.

(51) Int. Cl.

| | | |
|---|---|---|
| *E04B 1/34* | (2006.01) | |
| *E04H 1/12* | (2006.01) | |
| *E04B 1/348* | (2006.01) | |
| *B65D 88/12* | (2006.01) | |
| *B65D 90/06* | (2006.01) | |
| *B65D 88/00* | (2006.01) | |
| *E04B 1/343* | (2006.01) | |
| *B60P 1/64* | (2006.01) | |
| *B60P 3/34* | (2006.01) | |
| *B65D 90/02* | (2006.01) | |

(52) U.S. Cl.
CPC .............. *E04B 1/3483* (2013.01); *B60P 1/6418* (2013.01); *B60P 3/34* (2013.01); *B65D 88/005* (2013.01); *B65D 88/12* (2013.01); *B65D 90/023* (2013.01); *B65D 90/06* (2013.01); *E04B 1/34336* (2013.01); *E04H 1/12* (2013.01); *E04H 2001/1283* (2013.01)

(58) Field of Classification Search
CPC .............. E04B 1/3483; E04B 1/34336; E04B 1/34331; B60P 1/6418; B60P 3/34; B65D 88/005; B65D 88/12; B65D 90/023; B65D 90/06; E04H 1/12; E04H 2001/1283
USPC .............. 52/64, 66, 70, 79.1, 79.2, 79.5, 143, 52/79.9, 122.1, 125.2, 125.6
See application file for complete search history.

(56) References Cited

U.S. PATENT DOCUMENTS

| | | | | |
|---|---|---|---|---|
| 3,792,558 | A * | 2/1974 | Berce et al. ..................... | 52/79.7 |
| 4,599,829 | A * | 7/1986 | DiMartino, Sr. ................ | 52/79.7 |
| 4,620,404 | A * | 11/1986 | Rizk ................................ | 52/602 |
| 4,833,841 | A * | 5/1989 | Ellington, III ................. | 52/79.1 |
| 4,835,922 | A * | 6/1989 | Bersani ....................... | 52/223.13 |
| 4,854,094 | A | 8/1989 | Clark | |
| 4,891,919 | A | 1/1990 | Palibroda | |
| 4,910,932 | A * | 3/1990 | Honigman ...................... | 52/280 |

(Continued)

*Primary Examiner* — Chi Q Nguyen
(74) *Attorney, Agent, or Firm* — Cozen O'Connor

(57) ABSTRACT

A volumetric module that can have all of its exterior claddings, windows, doors, interior finishes, cabinetry, plumbing, electrical, mechanical, and roofing installed and completed in the factory minimizing work to be completed in the field, and a method to protect the fully finished building module during transport with a series of demountable transport panels. The finished and protected building module is transported to a site utilizing the intermodal shipping network or by different modes of shipping and transportation. At the building site, the finished building module is placed on a foundation or other form of support, the transport panels are removed from the module revealing a fully finished building module suitable for use as a habitable building both in it singular use as well as the creation of a larger habitable building by joining finished building modules at the building site.

19 Claims, 18 Drawing Sheets

(56) References Cited

U.S. PATENT DOCUMENTS

| | | | |
|---|---|---|---|
| 5,647,181 A * | 7/1997 | Hunts | 52/282.1 |
| 5,706,614 A * | 1/1998 | Wiley et al. | 52/79.1 |
| 5,735,639 A * | 4/1998 | Payne et al. | 405/129.57 |
| 5,761,854 A * | 6/1998 | Johnson et al. | 52/69 |
| 7,827,738 B2 * | 11/2010 | Abrams et al. | 52/79.1 |
| 8,001,730 B2 * | 8/2011 | Wallance | 52/79.1 |
| 8,186,110 B2 * | 5/2012 | Green | 52/79.9 |
| 8,291,647 B2 * | 10/2012 | Esposito | 52/66 |
| 8,347,560 B2 * | 1/2013 | Gyory et al. | 52/79.5 |
| 8,365,473 B2 * | 2/2013 | Bjerre | 52/79.9 |
| 2001/0047628 A1 * | 12/2001 | Mouton et al. | 52/144 |
| 2003/0150769 A1 * | 8/2003 | Lau | 206/600 |
| 2003/0213188 A1 * | 11/2003 | Bigelow | 52/174 |
| 2004/0083671 A1 * | 5/2004 | Johnson et al. | 52/511 |
| 2004/0194401 A1 * | 10/2004 | Smith et al. | 52/169.12 |
| 2005/0193643 A1 * | 9/2005 | Pettus | 52/79.1 |
| 2007/0271857 A1 * | 11/2007 | Heather et al. | 52/79.9 |
| 2008/0066422 A1 * | 3/2008 | Huxel | 52/745.2 |
| 2008/0134589 A1 | 6/2008 | Abrams et al. | |
| 2008/0276553 A1 * | 11/2008 | Ingjaldsdottir et al. | 52/184 |
| 2008/0282631 A1 * | 11/2008 | Breimer | 52/271 |
| 2009/0019811 A1 * | 1/2009 | Goldman | 52/653.2 |
| 2009/0223143 A1 * | 9/2009 | Esposito | 52/79.1 |
| 2010/0077678 A1 * | 4/2010 | Boardman | 52/173.1 |
| 2011/0000146 A1 * | 1/2011 | Takeda et al. | 52/79.1 |
| 2013/0036702 A1 * | 2/2013 | Pacetti et al. | 52/653.2 |
| 2015/0034634 A1 * | 2/2015 | Mullaney | 220/1.5 |

* cited by examiner

MODULAR HOUSING

CROSS-REFERENCE TO RELATED APPLICATIONS

This application claims priority to U.S. Provisional Application No. 61/292,630 filed on Jan. 6, 2010, the entire contents of which are incorporated herein by reference.

FIELD OF THE INVENTION

This invention relates generally to building construction, in particular, to modular building construction. More specifically, this invention relates to prefabricated building modules, constructed in an offsite factory, and a method and elements for maximizing the completion of the modules in the factory environment before transporting the modules to a building site, in addition to a method and apparatus for transporting the modules from the factory environment to the building site.

BACKGROUND OF INVENTION

Modular building construction has the advantages over conventional construction in the field of lowered construction costs, shortened construction schedules, and a controlled building environment that reduces waste. By using automatic assembly equipment and repetitive assembly-line techniques, factories can assemble modules for buildings more efficiently and with greater consistency in product quality than buildings built conventionally in the field. A trained and closely supervised factory workforce, with lower labor rates than those found of workers in the field, assembly line efficiencies with precision jigs, and construction in a controlled environment with material protected from the elements all add to the cost saving benefits of modular construction.

Historically, there are two challenges in the modular building construction industry. The first is to complete as much of the modules as possible in the factory because once onsite, labor, materials, and coordination are much more expensive and harder to control. The second is delivery itself; the expense of moving large modules long distances continually threatens the industry's ability to be cost competitive.

To maximize the work completed in the factory and to maximize assembly line efficiencies, it is standard practice in the modular building industry to use module sizes that conform to the maximum width, length, and height allowed on the roadways over which the modules will travel. Typical modules are 12'-0"-16'-0" wide, 14'6" tall, and anywhere from 30'-60' long.

While this practice reduces the total number of modules needed to create the building, over-dimensioned modules must be transported on specialized trucks and specialized routes with large enough roadways, greatly impacting the costs associated with delivery of the modules to the field.

Due to the cost of shipping on these specialized trucks and routes, there are regional limitations in this industry that are tied to the geographic location of the respective factory. A factory will typically only service within a 200 mile radius of its location, as transporting the modules from the factory to a site beyond this range quickly becomes cost prohibitive. These regional limitations greatly impact the markets that can be served by a factory in the modular building industry.

Though the work needed to be performed in the field after the modules have been delivered is typically focused in the areas where modules are adjoined, this scope of work can vary greatly depending on how much preplanning went into the sizing of the structure of the modules and the subsequent thickness of the finishes and cladding to be installed, the precautions the factory takes to protect finishes, windows and doors, and other external features, as well as the complexity of the arrangement of the modules once adjoined and positioned on site.

In an effort to minimize the delivery costs, the modules are typically afforded minimum protection from potential damages that may arise from transporting the modules on roadways. It is standard practice in the industry to use plastic sheeting, or "shrink wrap", to protect the sides of the modules. Though this offers adequate protection for rough sheathings and rough assemblies, it does not offer enough protection for finish materials and finish assemblies. As a result, the factory will typically not install exterior finishes or exterior windows and doors for fear of potential damage during transport.

In addition, due to the limitations placed on the maximum width of the module by roadway requirements, every additional inch of thickness to the width of the module can have huge consequences on the routes allowed and the associated costs of delivery. Because factories prefer to build all modules with the same width for ease of assembly and fabrication within their jigs and not all of the modules used to create a building require exterior cladding and the addition of exterior cladding adds to the overall width of modules, it is standard practice to not deliver modules with exterior cladding and exterior windows and doors, thereby maximizing the width of all the modules for transport. In addition, since access is usually required in the field where modules are joined together, the exterior cladding and interior finishes typically cannot be installed on the modules in the factory at the locations that modules are to be joined. Since factories prefer to complete all of the exterior cladding and interior finishes at the same time, again it is standard practice to leave off the exterior cladding and much of the interior finishes and to complete the entirety of this work in the field.

It is also standard practice in the industry to not install the roofing in the factory as the slope of the roof adds additional height to the module that may cause the module to be over the maximum height restrictions of the roadways while it is on the truck.

Only completing modules to a semi-finished state is another key limitation in the modular industry. Typically 40-50% of modular building construction is left to be completed in the field after the modules have been delivered, subjecting that work to unpredictable labor costs in the field and unpredictable weather in the field, dramatically affecting the overall building construction cost. This work is typically not completed by factory labor, but is handed off to a local general contractor and a multiplicity of trades people to complete the building, all whom have limited product experience and limited knowledge of the work done to the modules in the factory and the work needed to be completed in the field to finish the modules. This often unclear division of labor leads to finger pointing about who should take responsibility for what work and also has implications on warranty coverage.

In an attempt to confront the regional limitations of the modular industry due to its construction and delivery methods, there are two new practices in the modular building industry to utilize modified shipping containers or container-like structures as the modules to construct a building in an attempt to be able to deliver them utilizing the intermodal transportation network. In contrast to the specialized trucks required to transport typical building modules, the shipping container industry utilizes shipping containers that are transported via a global infrastructure network of trucks, rails, and ships established to move shipping containers practically anywhere in the world at low cost and with ease. Due to their size, the modules typically used in the modular-building industry cannot be transported on this network.

The first new practice, the use of modified shipping containers, is fundamentally problematic for utilization in building construction and habitation. Shipping containers are un-insulated and due to the lack of framed construction and the use of metal skins for the roof and walls, it is difficult to add plumbing, mechanical, and electrical systems. Given the dimensional limits of the containers, typically 8 feet wide and 9-6 feet tall, the need to add insulation and framing at the walls, insulation and roofing membrane at the roof, ceiling framing and finish flooring over the plywood subfloor of the container, all of which can only be added inside the metal skins of the container, causes the spaces within the container to not be comfortably habitable in regards to room widths and ceiling heights.

Additionally, because the metal skins forming the exterior walls are integral to the structural integrity of the shipping container, when they are cut to allow for openings they severely compromise the structural integrity of the container and additional structural support must be added. Once the shipping container has been modified, though it typically no longer meets all of the standards of cargo for a shipping container for intermodal transport, it still can be shipped utilizing the intermodal transportation network. However, depending on the amount of modifications made to the container, it typically can no longer structurally perform to or otherwise meet the standards required for a shipping container and thus might have to be transported in a similar manner as the standard building modules, via a specialized truck or flatbed. Additionally, after modifications and openings in the external metal skins have been made for habitation, the shipping container is no longer protected at those openings during transport.

Further, in the shipping industry's effort to maximize the interior storage volume of the container, the external metal skin of the container is set back from the outside faces of the corner fittings the absolute minimum amount to allow the fittings to be engaged with the standard load handling equipment used in the intermodal network. The dimensional relationship between the metal skin and the corner fittings precludes the ability to add any exterior cladding, windows or doors, and roofing to the container that would protrude beyond the metal skin and still have the container be able to be handled properly via the intermodal network. This translates to exterior cladding, windows, doors and roofing not being able to be installed in the factory and subsequently needing to be installed in the field after the containers have been transported from the factory.

A second new practice in the modular building industry is to utilize container-like structures, that are essentially structures built to the specifications of a shipping container, rather than modifying existing shipping containers. These container-like structures have the ability to be transported via the intermodal network. Because these container-like structures do not solely rely on the metal skin for their structural integrity, they offer the advantage of more flexibility to have larger openings than by modifying and cutting an existing shipping container. However, in their attempt to conform to the intermodal requirements of a shipping container and their acceptance of only attaining a semi-finished state of completion to the container-like structures in the factory prior to transport, they typically rely on a metal skin to form their walls and roofs much like shipping containers. These container-like structures thus have the same dimensional restrictions between the external metal skin and the corner fittings that preclude the ability to add any exterior cladding, windows or doors, and roofing to the container-like structure while still being able to be handled properly via the intermodal network. Accordingly, most of the work to create a habitable building must be completed in the field.

In U.S. Pat. No. 4,854,094 a method is disclosed for creating a habitable building utilizing standard shipping containers that are transported to the field. The shipping containers are not fit for habitation. After they have been joined in the field, various materials are added to the shell of the containers to complete the building and make it habitable. This work includes opening portions of adjoining walls between the containers to create a larger habitable space, installing a raised floor, installing a roof over the containers, installing a dropped ceiling and insulation, installing interior wall finishes and insulation, installing a weather resistant exterior cladding and exterior insulation, opening up walls for windows and doors and installing windows and doors. While the shipping containers can be transported to the field via the intermodal network, it is clear that the benefits of modular building whereby modules can be constructed in a controlled factory environment are not afforded to a system where the majority of the work is necessitated to be completed in the field.

In U.S. Pat. No. 5,706,614 a method is disclosed for creating a habitable building utilizing shipping containers, whereby the shipping containers are modified in a factory environment before being transported to the field. The modifications to the shipping containers include securing a weather resistant outside covering to the outside of the corrugated metal skin of the containers, securing a plastic roof cap to the top of the container roof, providing windows and doors in the openings cut in the walls of the container, securing inner walls and insulation, securing a ceiling structure and insulation and providing a finish flooring. While completing this work before the containers are transported to the field affords this system the benefits of construction in a controlled factory environment, the modifications made to the shipping containers preclude them from being able to be transported via the intermodal network. The additional exterior roof, additional exterior wall covering and additional windows and doors that are added to make the container fit for habitation all protrude beyond the metal skin and the corner fittings of the container, making the container no longer able to be handled properly via the intermodal network.

In U.S. Pat. No. 4,891,919 a method is disclosed for constructing a containerized home, which in its unassembled state has the size and shape of a standard "high cube" steel shipping container, whereby in the field the steel walls of the container-like structure will unfold and composite panels stored within the container-like structure are then attached to form the outer walls of the home. While the transportable container-like structure has the same size and shape of a standard cargo shipping container and can be transported to the field via the intermodal network, all of the exterior walls, windows and doors, interior walls and roofs that are needed to make the container-like structure fit for habitation, are stored within the container-like structure and are then assembled in the field to complete the building and make it habitable. While the container-like structure can be transported to the field via the intermodal network, it is clear that the benefits of modular building whereby modules can be constructed in a controlled factory environment are not afforded to a system where the majority of the work is necessitated to be completed in the field.

In all of the above cases, even though a shipping container or a container-like structure is being used as the basis for a building module, these designs either structurally undermine the module so that they cannot ship safely or efficiently through the intermodal network or they arrive in a semi-finished state and require extensive, expensive, and unpredictable site-work to make the buildings fit for habitation.

SUMMARY OF INVENTION

To overcome the problems and disadvantages experienced with the heretofore new and standard practices in modular building construction, the modular building system of the present invention has been devised.

One embodiment of the invention is a method to construct a volumetric module for building construction that can maximize the completion of the module in the factory environment where labor and quality can be controlled, that can have all of its exterior claddings, windows, doors, interior finishes, cabinetry, plumbing, electrical, mechanical, and roofing installed and completed in the factory, thereby minimizing the work required to be completed in the field to create a habitable building, and a method to protect the fully finished building module during transport with a series of demountable transport panels and a method whereby the fully finished and protected building module can be transported to a building site utilizing the intermodal shipping network or by a plurality of different shipping and transportation methods.

According to one embodiment of the invention, upon arrival at the building site, the building module is placed on and secured to a foundation or other form of support, the transport panels are removed from the module revealing a fully finished building module suitable for use as a habitable building, both in it singular use as well as the creation of a larger habitable building via joining a plurality of the modules together at the building site, in each instance requiring minimal work in the field at the building site to create the habitable building.

These and other objects of this invention are accomplished by providing a fully finished building module. The term fully finished refers to but is not limited to the installation and substantial completion in the factory prior to transport to the building site of a substantially finished floor assembly, substantially finished wall assemblies, substantially finished exterior window and door assemblies, substantially finished roof assemblies, substantially finished interior and exterior building finishes, cabinetry, plumbing systems and fixtures, electrical systems and fixtures and mechanical systems and fixtures.

A building module has a volumetric rectangular cuboid shape, comprising two vertically oriented opposing side planes, two vertically oriented opposing end planes, a horizontally oriented top plane and a horizontally oriented bottom plane, wherein four corner fittings are arranged along the top plane of the module at each intersection of the side planes and the end planes and four corner fittings are arranged along the bottom plane of the module at each intersection of the side planes and end planes.

The eight corner fittings each comprise at least three faces, with the fittings on the top plane each having a face parallel to a respective side plane, a respective end plane and the respective top plane and the fittings along the bottom plane each having a face parallel to a respective side plane, a respective end plane and the bottom plane. Each fitting has slotted holes on each of the faces to be used for the handling and securing of the module, primarily by standard intermodal load handling equipment utilized to transport shipping containers. The top corner fittings are slotted to interface from the sides and above, the bottom corner fittings are slotted to interface from the sides and below.

The positioning of the corner fittings such that the vertical and horizontal dimensions between their respective faces are in substantial conformance with the vertical and horizontal dimensions required for the placement of corner fittings for a shipping container to be handled and secured by standard intermodal load handling equipment. In the preferred embodiment of this invention, the dimensions conform to the required placement of corner fittings for a "high cube" shipping container, though in other embodiments, the dimensions may conform to those required for other sizes of shipping containers.

The module includes a skeletal frame of bearing members, comprising beams arranged along the top plane to support a roof assembly and beams along the bottom plane to support a floor assembly, with columns connecting the respective beams, the bearing members of the skeletal frame positioned relative to the outside faces of the corner fittings such that prior to transport of the module, a series of demountable transport panels can be attached to the bearing members such that the outside faces of the demountable transport panels are set inboard from the outside faces of the corner fittings at least by the minimum distance required for the proper handling and securing of the corner fittings by standard load handling equipment for shipping containers. The series of demountable transport panels along the side and end planes of the module are attached at the top to the sides of the beams along the top plane and at bottom to the sides of the beams along the bottom plane, the series of demountable transport panels along the top plane of the module are attached to the tops of the of the respective beams along the top plane and the series of demountable transport panels along the bottom plane of the module are attached to the bottoms of the respective beams along the bottom plane. The demountable transport panels may be made of a composite material, corrugated metal, sheet metal, marine plywood sheet, tongue and groove plywood or any material of suitable strength and weather resistance to protect the finishes and assemblies of the fully finished module and to stand up to the rigors of transport and handling. In the preferred embodiment of this invention, the beams of the skeletal frame are steel "C" channels and the columns are square tube steel, though in other embodiments different materials and different shapes may be used for the bearing members of the skeletal frame.

Prior to the attachment of the demountable transport panels to the module, a complete wall assembly is arranged and positioned along the side planes and end planes and attached to the bearing members of the skeletal frame such that the outer most face of the wall assembly will be inboard of the inner face of the demountable transport panels upon their attachment along the side and end planes prior to the transport of the module to the site. The wall assembly includes but is not limited to a finished exterior cladding, a channel or furring strip utilized to create an air gap for a rain screen assembly, a layer of waterproofing membrane, a layer of building sheathing, framing members such as studs, insulation material and an interior finish surface. In the preferred embodiment of this invention, the finished exterior cladding materials consists of both vertical wood siding and corrugated metal panels, the waterproof membrane consists of a building wrap and flexible flashing, plywood sheathing is used as the building sheathing, either metal or wall framing studs are used, the insulation material consists of a combination of batt insulation and spray-in loose fill insulation or spray foam and the interior finish surfaces consists of painted gypsum board and ceramic tile, though in other embodiments, different materials may be incorporated into the making of the wall assembly. It should be understood that the wall assembly may run the full length of the side and end planes, or may run along portions of the side and end planes, or may not run along the side and end planes of a module at all, depending on the relationship of the module to the other modules that will be adjoined to it at the site to form the habitable building.

Additionally, prior to the attachment of the demountable transport panels to the module, an exterior window assembly can be set into the wall assembly or positioned in place of the wall assembly such that the outer most face of the window assembly will be inboard of the inner face of the demountable transport panels upon their attachment along the side and end planes prior to the transport of the module to the site. Further, an exterior door assembly can be set into the wall assembly or positioned in place of the wall assembly such that the outer most face of the door assembly will be inboard of the inner face of the demountable transport panels upon their attachment along the side and end planes prior to the transport of the module to the site.

Prior to the attachment of the demountable transport panels to the module, a complete roof assembly is arranged and positioned along the top plane and attached to the bearing members of the skeletal frame such that the outer face of the roof assembly will be inboard of the inner face of the demountable transport panels upon their attachment along the top plane prior to the transport of the module to the site. The roof assembly includes but is not limited to a top waterproof surface or roofing membrane, an insulation material and an interior finish surface. In a preferred embodiment, the roofing assembly comprises a metal clad insulating panel, with the top metal cladding forming a waterproof roofing surface and the bottom metal cladding acting as a finished ceiling thereby eliminating the need for the installation of an additional ceiling assembly. In other embodiments, different materials may be incorporated into the making of the roof assembly. It should be understood that the roof assembly may run the full length of the top plane, or may run along portions of the top plane, or may not run along the top plane of a module at all, depending on the relationship of the module to the other modules that will be joined to it at the site to form a habitable building.

Prior to the attachment of the demountable transport panels to the module, a complete floor assembly is arranged and positioned along the bottom plane and attached to the bearing members of the skeletal frame such that the outer face of the floor assembly will be inboard of the inner face of the demountable transport panels upon their attachment along the bottom plane prior to the transport of the module to the site. The floor assembly includes of but is not limited to interior finish flooring, floor sheathing, framing members such as joists and insulation material. In the preferred embodiment of this invention, the interior finish flooring consists of engineered tongue and groove wood flooring boards and ceramic tile, the framing members consist of wood or steel joists, plywood sheathing is used as the flooring sheathing with an underlayment layer placed between the wood flooring and the sheathing and the insulation material consists of a combination of batt insulation and spray-in loose fill insulation, though in other embodiments, different materials may be incorporated into the making of the floor assembly. It should be understood that the floor assembly may run the full length of the bottom plane, or may run along portions of the bottom plane, or may not run along the bottom plane of a module at all, depending on the relationship of the module to the other modules that will be adjoined to it at the site to form a habitable building.

Prior to the attachment of the demountable transport panels to the module, a host of additional interior finishes, fixtures and systems are added to the module, includes but is not limited to electrical wiring, electrical panels, lighting fixtures and switches, power outlets, smoke detectors, plumbing supply lines and drain lines and vents, water heater, sink, bathtub, shower, plumbing fixtures, mechanical ductless air conditioning and heating units, fire sprinklers, finished interior partition walls, interior doors, cabinetry, closets, appliances, all arranged and positioned such that the outer face of any finish, fixture or system will be inboard of the inner face of the demountable transport panels upon their attachment along the top, bottom, side and end planes prior to the transport of the module to the site.

The attachment of a series of demountable transport panels to the module completely covers and protects the top plane, bottom plane, side planes and end planes, thereby providing a layer of protection material of suitable strength and weather resistance to protect the finishes and assemblies that have been completed in the factory of the fully finished module and to stand up to the rigors of transport and handling by standard intermodal load handling equipment. In the preferred embodiment of this invention, the transport panels are made of composite materials, however alternate embodiments may use other transport panel materials and assemblies such as metal, sheet metal, corrugated metal, stamped metal, wood, plywood, marine plywood, tongue and groove materials, structurally insulated panels, sandwiched foam panels, foam, fiberglass, plastic, glass, gypsum, fiber cement, concrete, canvas, fabric, tile or stone. The series of demountable transport panels are fastened to the bearing members of the skeletal frame, or to blocking attached to the bearing members, with either screws or other suitable forms of attachment that allow for easy removal of the panels upon delivery to the building site.

The transport of the fully finished building module from the factory to the building site can be effected by a plurality of different modes of shipping and transportation, including but not limited to truck, rail, and boat, some of which or all of which being part of the intermodal shipping network used for the transport of shipping containers.

At the building site, a foundation or other form of support has been prepared before the delivery of the module or plurality of modules to the building site. Upon arriving at the building site, the demountable transport panels are removed from the fully finished building module prior to the placement of the module onto the foundation or other form of support and prior to the subsequent joining of other modules, if the habitable building is to be created from more than one module. In the preferred embodiment of this invention, a plurality of modules are joined together such that one module acts as the front to the habitable building, one module acts as the back to the habitable building, with any number of modules in between, each module oriented the same way to each other and to the site and each module adjoined to the adjacent module along one or both of its side planes. In a preferred embodiment, the foundation comprises at least two parallel uninterrupted runs of stem walls, the width between the two walls substantially equal to the width between the bearing members along the bottom plane of the module at the two opposing end planes, the stem walls running the length of the habitable building and extending beyond the building at the front and back, whereby the modules can be off-loaded from the truck and slid into position on the foundation along the top of the stem walls with the use of metal skid plates in a manner precluding the need for using a crane to position the modules onto the foundation. The top of the stem wall has intermittent steel weld plates installed that can be welded to the bearing members along the bottom plane of the modules, precluding the need to use the corner fittings as means of attachment to the foundation. Additionally in a preferred embodiment, once in position on the foundation, the modules can be bolted together between the adjoining bearing members along the top and bottom planes of each respective module, precluding the need to use the corner fittings as a means of attachment between the adjoining modules. In other embodiments, a plurality of modules may be adjoined in a plurality of orientations to each other and to the site, in addition to other means of supporting the modules, such as pier support, jacks, blocks or any other permanent or temporary support apparatus capable of supporting the load of the modules.

The orientation of the plurality of modules in the preferred embodiment, comprises each fully finished building module adjoined to the adjacent fully finished building module along one or both of its side planes whereby the inset of the bearing members of the skeletal frame of each module from the respective outside faces of the corner fittings of said module cause a regularized gap to be created between the bearing members of the skeletal frame of one module and the bearing members of the skeletal frame of the adjoining module when outside faces of each modules respective corner fittings are brought together, in turn causing the same regularized gap between the interior and exterior finishes of one fully finished building module and the interior and exterior finishes of the adjoined fully finished building module at the wall assemblies, roof assemblies and floor assemblies. Additionally in the preferred embodiment, a regularized and precut channel or cover plate is fastened within or over each gap along the interior finishes and the exterior finishes of the wall assemblies, the roof assemblies and floor assemblies, such that the channel or cover plate is capable of concealing any possible misalignment of finishes between the two adjoining modules and whereby the addition of the regularized channels or cover plates constitutes the only work to be completed in the field to make the building habitable. In the preferred embodiment, sheet metal is used to form the precut channels along the exterior finishes of the wall assemblies, whereby extending the channel lengths allows them to additionally provide a finish material to conceal the up to now exposed faces of the corner fittings of each module. Wood or medium density fiberboard is used to form the precut channels along the interior finishes of the wall assemblies. Two precut tongue and groove wood flooring boards act as cover plates at the interior finish of the floor assembly, each with one tongue and groove end and one end precut to fit within the regularized gap. A precut metal cover plate is used along the exterior finish of the roof assembly and a precut wood or medium density cover plate is used along the interior finish of the roof assembly. Though in other embodiments, different materials may be used for the channels and cover plates, in addition to the possibility of an additional layer of insulation and finish roofing added to the roof assembly if warranted by climate considerations.

The orientation of the plurality of modules in a preferred embodiment, with one module acting as the front of the habitable building and one module acting as the back of the habitable building, eliminates the exterior channels and cover plates along the wall assemblies where modules are joined being visible at the front and back of the building.

The orientation of the plurality of modules in the preferred embodiment, comprises one of the modules functioning as wet module, containing all or substantially all of the plumbing systems and fixtures required for the habitable building, thereby eliminating any work required in the field to interconnect plumbing systems between modules.

Modules can be stacked one or more modules on top of each other, to form a multi-storied habitable building. In a preferred embodiment, a second story of modules can be added, the modules for the second story can be placed on top of the first story of modules using a forklift or similar equipment, thusly precluding the need for using a crane to position the modules.

BRIEF DESCRIPTION OF THE FIGURES

These and other aspects, features, objects, and advantages of the present invention will become more apparent from the following detailed description of the presently most preferred embodiment thereof which is given for the purposes of disclosure, when read in conjunction with the accompanying drawings which form a part of the specification, but which are not to be considered limiting in it scope, wherein.

DETAILED DESCRIPTION OF THE PREFERRED EMBODIMENTS

A detailed description of the figures that contain preferred embodiments of the present invention, as well as other embodiments, will now be described below, with like numerals designating like parts throughout multiple illustrations. Although the illustrations reference residential construction, it should be clear that the invention can also be used in the construction of other single and multi-story structures, including, but not limited to, office, retail, industrial, assembly, educational, and laboratory structures.

This invention describes a method to construct volumetric a building module that maximizes the completion of the module in the factory environment and can be substantially protected for transport using the intermodal shipping network in a such way as to allow volumetric modules to be "fully finished" in a factory, therein maximizing construction efficiencies. "Fully finished" is defined by but not limited to the installation and completion in the factory prior to transport to the building site of a finished floor assembly, finished wall assemblies, finished exterior window and door assemblies, finished roof assemblies, finished interior and exterior building finishes, cabinetry, plumbing systems and fixtures, electrical systems and fixtures and mechanical systems and fixtures.

Figure 1:
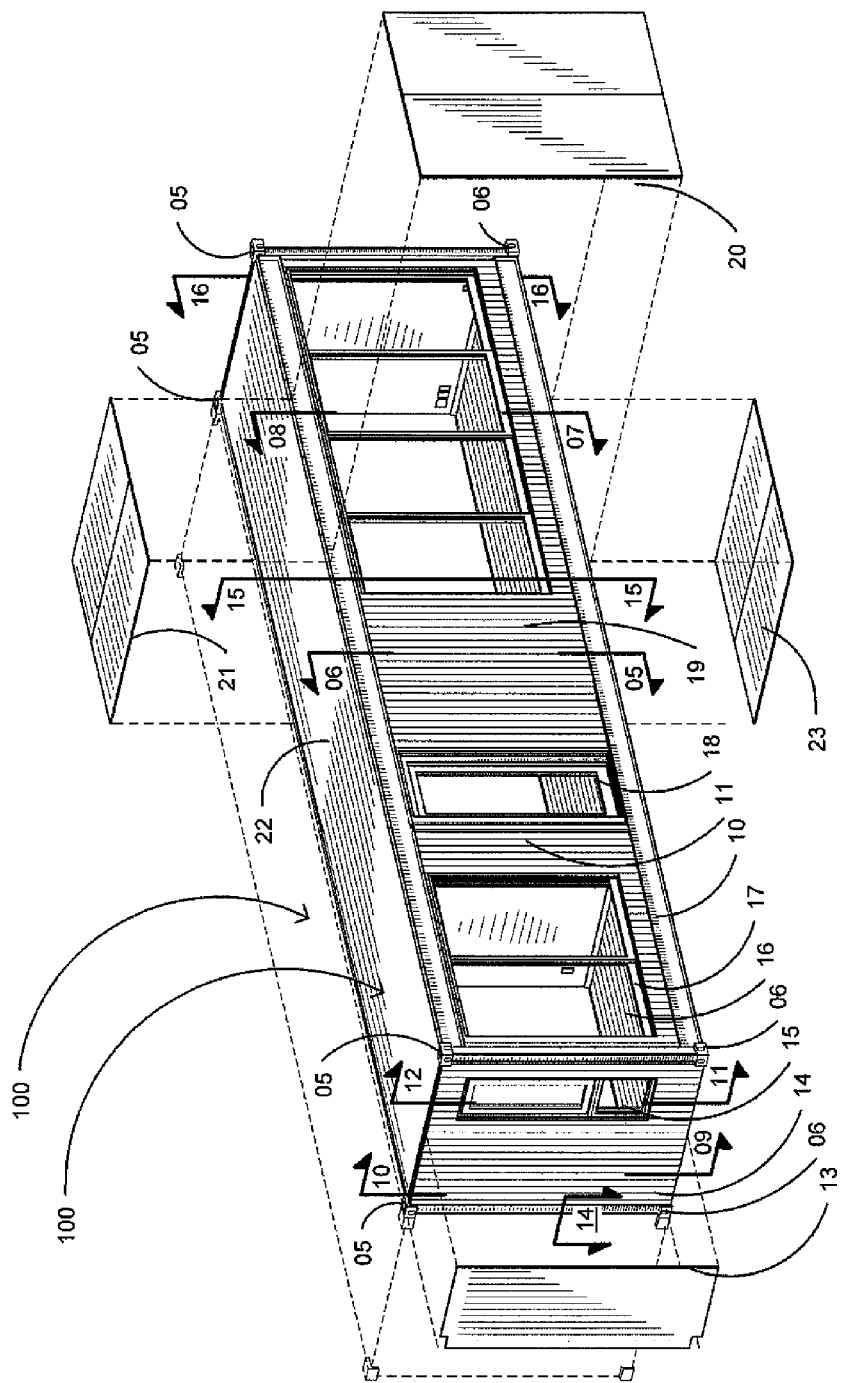
FIG. 1 is an exploded perspective view of a preferred embodiment of the fully finished building module of the present invention, known below as the Finished Building Module herein "FBM"
Figure 2:
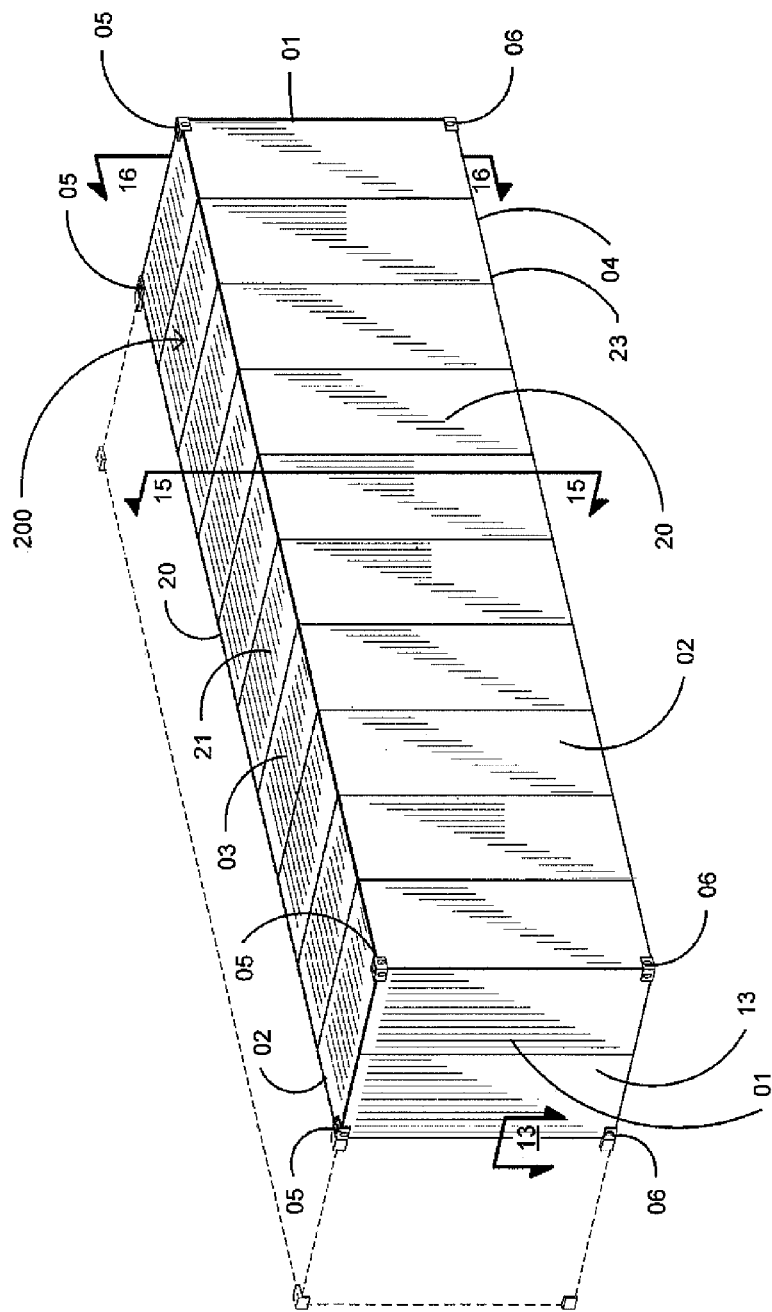
FIG. 2 is a perspective view of a preferred embodiment of the present invention shown ready for transport, with demountable transport panels attached to protect the fully finished building module shown in FIG. 1.
Figure 3:
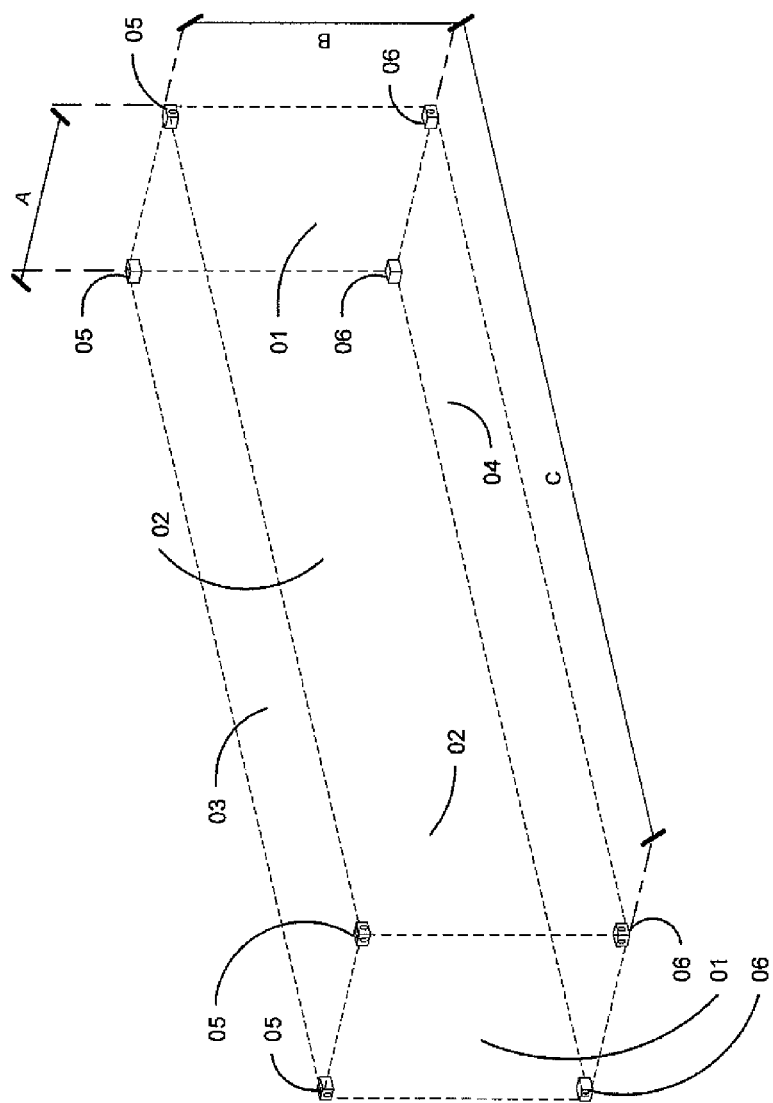
FIG. 3 is a perspective view of a preferred embodiment that generally locates the dimensional limits of the present invention.

Referring to the drawings and initially to FIG. 1, there is shown the "fully finished" building module designed to streamline the modular building construction process by maximizing the work that can be completed in the factory prior to transport and thereby minimizing the work required in the field to create a habitable building, in addition to a method to protect the fully finished building module during transport with the attachment of a series of demountable transportation panels. This finished building module "FBM" is generally designated FBM 100, referring to the module in a fully finished state as it appears both at the factory upon completion of module construction and after module installation at the building site. Dashed lines in this illustration represent the application and removal of the end plane transport panels 13, side plane transport panels 20, top plane transport panels 21, and bottom plane transport panels 23 that are integral to this invention and protect completed building modules from the rigors of long-distance module transport and handling. Other dashed lines represent how, once onsite, other FBM 100's are joined together to make larger structures, such as the single story house of FIG. 17, or the two story house in FIG. 18. FIG. 2, shows a FBM 200 with a complete set of transport panels 13, 20, 21, 23 applied to a fully finished building module so as to be ready for shipment and handling. This fully protected version of the FBM is generally designated FBM 200.

The basis for FBM 100 and FBM 200 are described in FIGS. 3-6. Firstly, FIG. 3 lays out the limits of the dimensional envelope for FBM 200's rectangular cuboid volume, as FBM 200 has transport panels attached and is therefore a larger rectangular cuboid volume than FBM 100. This three dimensional spatial envelope is generally comprised of two end planes along the short sides 01, two side planes along the long sides 02, a top plane 03 and a bottom plane 04, and top corner fittings 05 and bottom corner fittings 06 at the corner intersections of these planes, placed to aid in transport and handling of the modules. The corner fittings 05, 06 are comprised of 3 exposed faces. The outside faces are placed such that they match the dimensions required for the placement of corner fittings for a shipping container, shown in dimensions A, B, C. There are slotted holes on each of the exposed faces of the corner fittings, with the ability to interface in either the horizontal or vertical direction with intermodal handling and shipping equipment. The bottom corner fittings 06 are slotted to interface from the ends, sides and below. The top corner fittings 05 are slotted to interface from the ends, sides and above. In the embodiment shown here, dimensions A, B, C match those for the placement of corner fittings for a "high cube" shipping container, though in other embodiments, the dimensions may conform to those required for other sizes of shipping containers. Shown in FIG. 3, in all embodiments of the invention, the two end planes 01, the two side planes 02, the top plane 03 and the bottom plane 04 of the rectangular cuboid volume are set back from the outside faces of the top corner fittings 05 and bottom corner fittings 06 at the minimum distance required for the proper handling and securing of the corner fittings by standard load handling equipment for shipping containers. These planes delimit the outermost faces of the FBM's transport panels 13, 20, 21, 23 shown in FBM 200, while the outside faces of the corner fittings project beyond the remainder of the module, allowing for handling and stacking per intermodal requirements.

Figure 4:
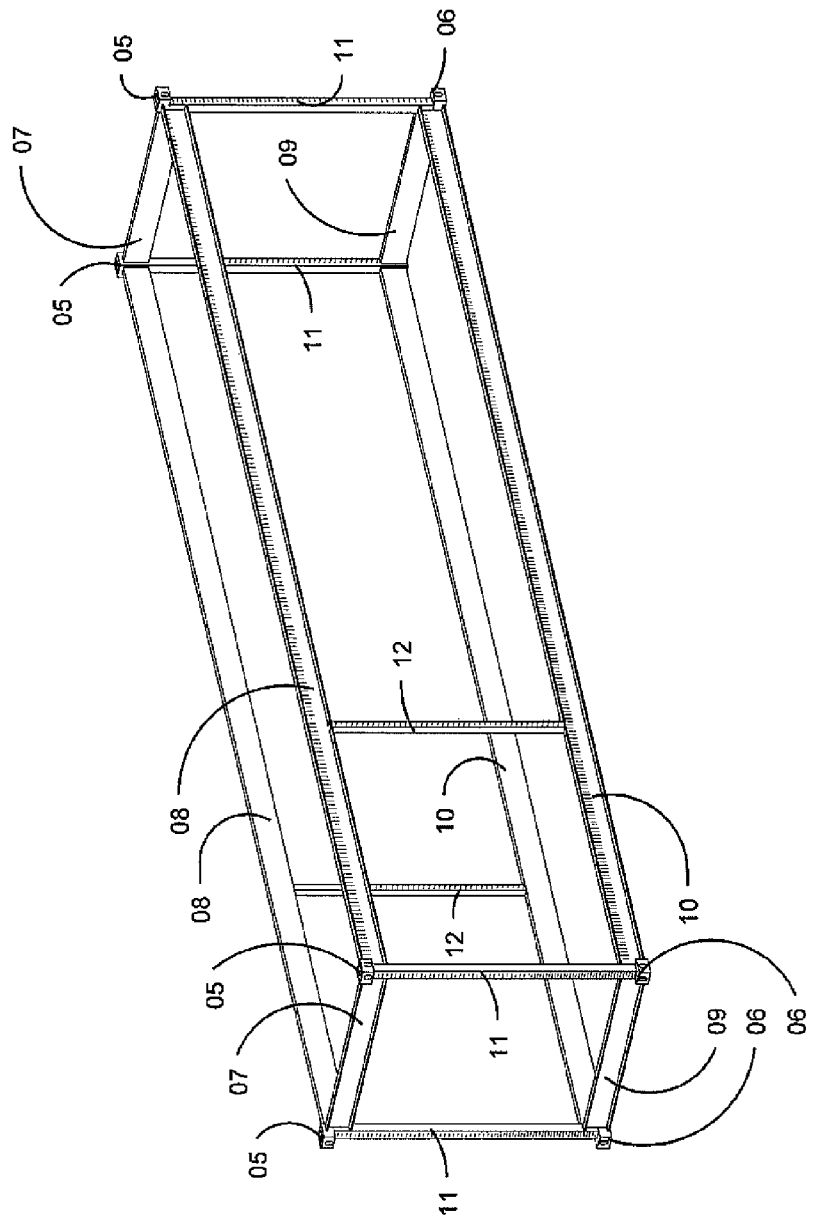
FIG. 4 is a perspective view of a preferred embodiment of the skeletal frame of bearing members that forms the basis for the module in FIG. 1.

FIG. 4 shows an embodiment of the skeletal frame of bearing members of the FBM 100 and 200, comprised of top corner fittings 05 and bottom corner fittings 06 integrated with a series of horizontal and vertical bearing members 07-11 that form the structural framework of a rectangular cuboid onto which the finished elements shown in FBM 100 and the transport panels shown in FBM 200 are affixed and/or supported. Placement of the bearing members of the skeletal frame is precisely calibrated so that once the finished building assemblies of the module and transport panels are attached, the outside faces of the end plane transport panels 13 and side plane transport 20 panels remains set back from the outside faces of the corner fittings at a minimum distance required for the proper handling and securing of the corner fittings by standard load handling equipment for shipping containers, as shown in FIG. 2. In the preferred embodiment shown here, the horizontal skeletal members 07-10 are structural steel "C" channels, with their C's facing outward. These are welded to structural steel tube columns 11 and the top corner fittings 05 and bottom corner fittings 06 to create a moment frame. Alternate embodiments use structural steel tube beams for the horizontal members of the skeletal frame 07-10. These skeletal frame members can also be made out of other appropriate materials such as aluminum, cold-rolled steel, or wood or composite wood and can also be made out of other appropriate shapes and sizes. In some of these cases, the beams and columns may be mechanically fastened instead of being welded. In all embodiments, every effort is made to keep the size of these skeletal members as small as possible, in order to maximize head room inside the modules. Additionally, intermediate column or columns 12 or shear panels may be included along the sides of the skeletal frame to assist with structural forces. In some cases these skeletal frames will no longer be moment frames but use other standard construction industry techniques for developing module shear resistance such as shear panels, shear walls, and floor and roof sheathing used for diaphragms.

In FIG. 2, FBM 200 shows side plane transport panels 20 attaching to top beams 08 and bottom beam 10 as shown in FIG. 4 and end plane transport panels 13 attaching to top beam 07 and bottom beam 09 shown in FIG. 4. In FBM 200, transport panels in the current embodiment are made of composite materials, however alternate embodiments may use other transport panel materials and assemblies such as metal, sheet metal, corrugated metal, stamped metal, wood, plywood, marine plywood, tongue and groove materials, structurally insulated panels, sandwiched foam panels, foam, fiberglass, plastic, glass, gypsum, cement, fiber cement, concrete, canvas, fabric, tile or stone or any material of suitable strength and weather resistance to protect the finishes and assemblies of the fully finished module and to stand up to the rigors of transport and handling.

In FIG. 1, FBM 100 is shown in an embodiment of its fully finished state, with end wall assemblies 14, side wall assemblies 19, end wall window and door assemblies 15, side wall window assemblies 17, side wall door assemblies 18, roof assemblies 22, and floor assemblies 16 all completed in the factory as well as all plumbing systems, electrical systems, and mechanical systems factory installed, requiring only basic hook-ups on site.

Figure 5:
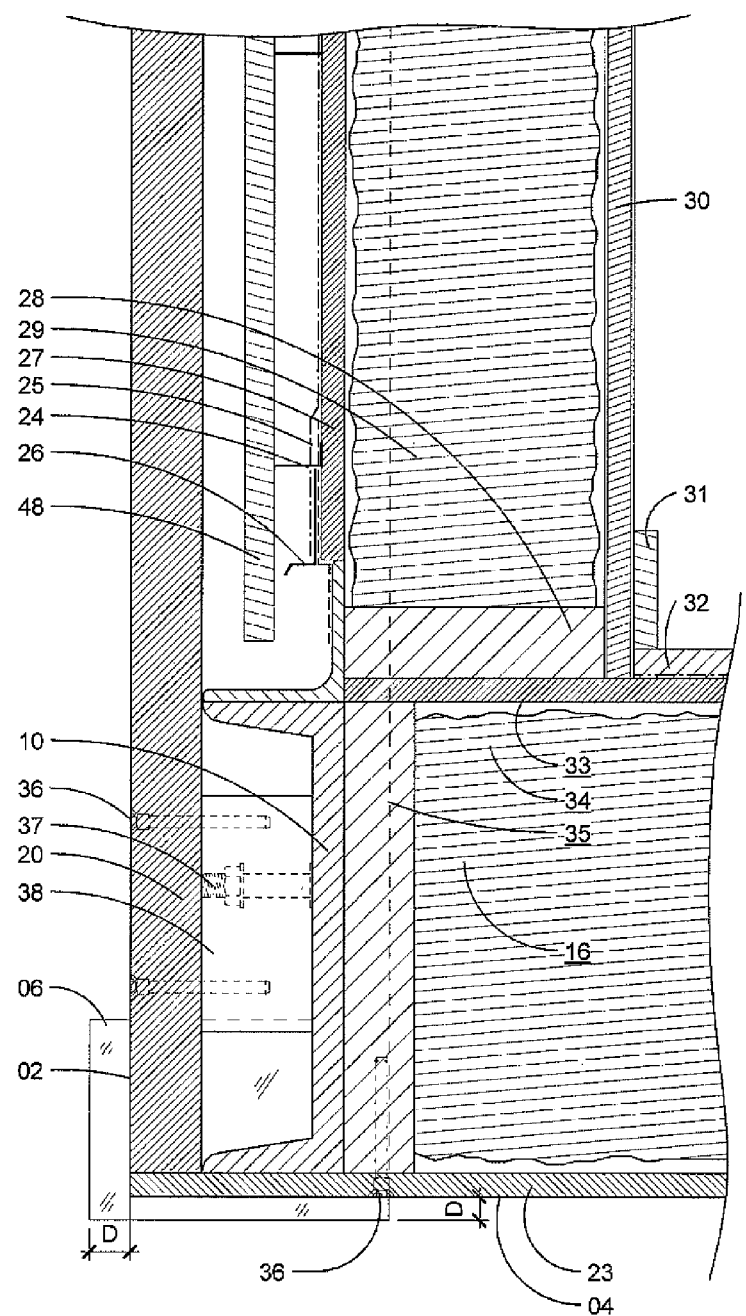
FIG. 5 is an enlarged cross-sectional view, taken substantially along the line 05 of FIG. 1.

FIG. 5 is a cross section view cutting through the base of the side wall in FBM 100, shown with the side and bottom transport panels 20, 23 attached. This figure shows a preferred embodiment for a finished wall assembly and is to be paired with FIG. 6, which shows the same wall at its top condition. In FIG. 5, exterior wood siding 48 is attached to perforated metal Z channels 24 which create an air gap and allows water that gets behind the exterior finish material to drain through perforations and find its way out of the wall cavity as is standard practice in common "rain screen" assemblies. A waterproof membrane 25, consisting of a building wrap and flexible flashing, and a metal drip at the base of the wall 26 are attached to plywood sheathing 27, which in turn is fastened to wood framing 28 that is filled with batt insulation 29 and has painted gypsum board 30 attached to its interior face. A baseboard 31 is installed to conceal the joint between the floor and wall assembly. The sum total of these pieces constitutes the bottom portion of a fully finished wall assembly. This wall assembly is located such that its outermost face is set back to accommodate the attachment of side plane transport panels 20 such that the outside face of the side plane transport panels 02 is set back from the outside faces of the bottom corner fittings 06 at a minimum distance D required for the proper handling and securing of the corner fittings by standard load handling equipment for shipping containers. It should be understood that the minimum distance D can vary in dimension depending on which outside face of the corner fitting it is in reference to. In the current embodiment, wood blocking 38, supported by a threaded bolt 37 welded to the floor beam 10, is used as an interface for the connection between the side plane transport panel 20 and the side floor beam 10. In other embodiments, transport panel attachment may be handled differently; for example, if the side floor horizontal skeletal members 10 are tube steel beams, the side plane transport panels may be fastened directly to the beams without blocking 38 acting as an interface.

While this preferred embodiment shows the exterior finish as a wood siding material 48 running vertically, it should be noted that the flexibility of the rain screen assembly allows almost any finish material in its preferred orientation to be used. This includes but is not limited to exterior finish materials such as metal panels, corrugated metal panels, engineered wood, wood, cement fiber panels or any other material used for exterior finish on a building. Also, although the preferred embodiment shows perforated Z channels supporting the exterior finish 24, this too could be any one of a number of channel or furring products running either horizontally or vertically. Also, although standard wood framing is show for the walls 28, any number of alternate framing systems could be used to frame the walls, including but not limited to light gauge metal framing and SIPs wall panels. Also, while this preferred embodiment shows wall insulation as batt insulation 29, it could be any number of alternative insulation systems, including but not limited to rigid insulation, spray-in foam insulation, spray-in loose fill insulation or SIPs panel construction with integrated insulation.

Also shown in FIG. 5 is an embodied version of the finished floor assembly 16. On the interior of the module is a finished wood floor 32, supported by floor sheathing 33 that bears on a wood framed floor 35 filled with batt floor insulation 34 and attached to the side floor beam 10. This assembly is protected for shipment by demountable transport panels 23 placed underneath the module. The placement of the component elements of the floor assembly 16 and the bottom plane transport panels 23 and bottom side members skeletal system 10 are such that the outside face of the bottom plane transport panel 04 is at distance D from the bottom face of the corner fitting 06, where D is defined as the minimum distance required for the proper handling and securing of the corner fittings by standard load handling equipment for shipping containers. While this preferred embodiment shows wood flooring material 32, it should be understood that any other flooring material, such as ceramic or stone tile or concrete could be used in other embodiments. Also, although wood framing 35 is shown as supporting the floor assembly, this system could also be other floor framing systems such as light gauge metal framing, steel deck, or SIPs panel construction. Also, although the floor insulation is shown as batt insulation 34, it could be any number of alternative insulation systems, including but not limited to rigid insulation, spray-in foam insulation, spray-in loose fill insulation or SIPs panels with integrated insulation. In some embodiments, it will be desired to build a deck or entryway into some or all of a module. In this case, exterior decking will be the flooring material and typically, there will be no floor insulation. Often one or more side walls will not be present, either because in that instance in the habitable building, interior spaces of one modules are connecting to interior spaces of an adjoining module and modules are being placed side-by-side or because at that instance there is a deck or entry area. In these cases, there will be no framed wall assemblies. It should be understood that the wall assembly may run the full length of the side planes, or may run along portions of the side planes, or may not run along the side planes of a module at all, depending on the relationship of the module to the other modules that will be adjoined to it at the site to form the habitable building.

Figure 6:
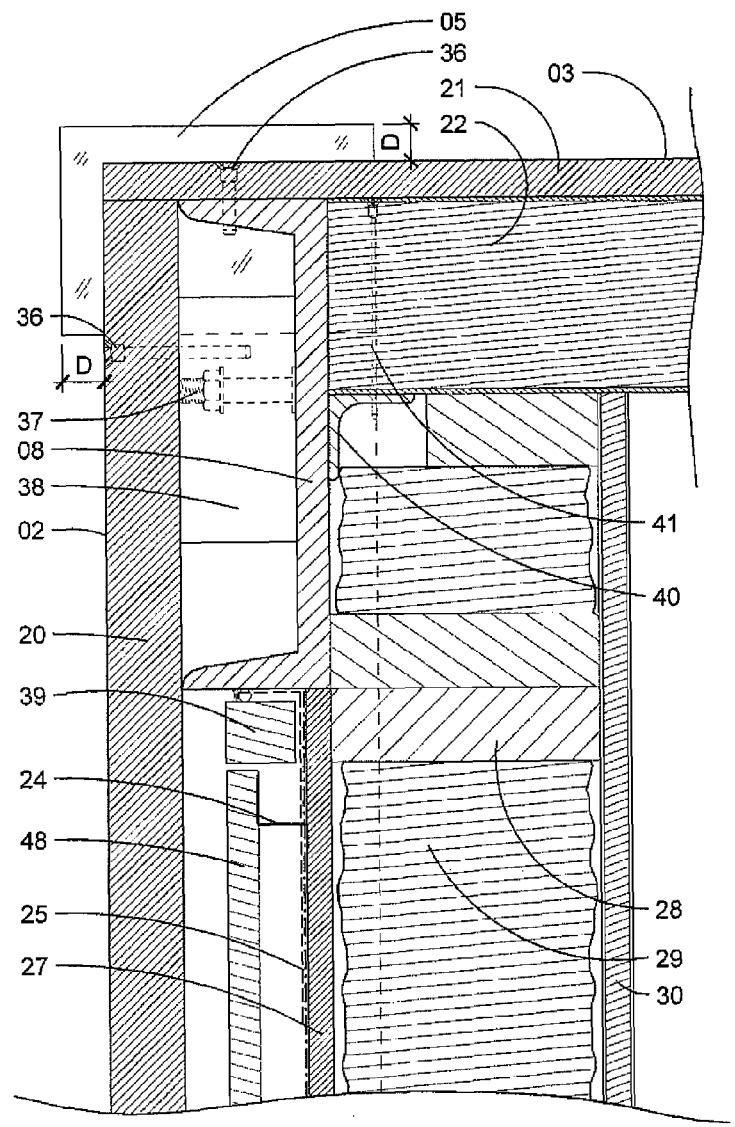
FIG. 6 is an enlarged cross-sectional view, taken substantially along the line 06 of FIG. 1.

FIG. 6 is a cross section view cutting through the top of the side wall in FBM 100, shown with the side and top transport panels 20, 21 attached. As in FIG. 5, the preferred embodiment here shows exterior wood siding 48 attached to perforated metal Z channels 24 which create an air gap and allows water that gets behind the exterior finish material to drain through perforations and find its way out of the wall cavity, as is standard practice in common "rain screen" assemblies. A waterproof membrane 25 is attached to plywood sheathing 27, which in turn is fastened to wood framing 28 that is filled with batt insulation 29 and has painted gypsum board 30 attached to its interior face. The sum total of these pieces constitutes the top portion of a fully finished wall assembly. Finished wall assemblies are located such that their outermost face is set back to accommodate the attachment of side plane transport panels 20 such that the outside face 02 of the side plane transport panels 20 is set back from the outside faces of the upper corner fittings 05 at a minimum distance D required for the proper handling and securing of the corner fittings by standard load handling equipment for shipping containers. As in FIG. 5, alternate embodiments for the exterior finish materials, wall furring, framing, insulation, and interior finish are all to be considered. In the current embodiment, wood blocking 38 supported by a threaded bolt welded to the beam 37 is used as an interface for the connection between the side plane transport panel 20 and the top beam 08. In other embodiments, side plane transport panel attachment may be handled differently; for example, when the top beams 08 are tube steel beams, the side plane transport panels may be fastened directly to the beams.

FIG. 6 is an embodiment of the finished roof assembly. In the current embodiment, the roof assembly is comprised of roof panels 22, supporting metal angles 40, and the side roof beams 08 they are attached to. The roof panels 22 are weather tight, act as roof insulation, are self-supporting and have a top metal cladding forming a waterproof roofing surface and a bottom metal cladding acting as a finished ceiling surface, thereby eliminating the need for the installation of an additional ceiling assembly. These bear on steel angles 40, attached with mechanical fasteners 41. These angles 40 are welded to the side roof beams 08. The placement of the component elements of the roof assembly and the top plane transport panels 21 are such that the top face 03 of the top plane transport panel 21 is at distance D from the top face of the top corner fitting 05, where D is defined as the minimum distance required for the proper handling and securing of the corner fittings by standard load handling equipment for shipping containers. While the preferred embodiment shows metal roof panels 22, it should be understood that other variants of the roof assembly are possible, such as one in which a layer of plywood is attached to the top of roof panels in order to aid with structural forces. Also, a wood or metal framed roof should be considered an option. In these cases, painted gypsum board could appear on the interior surface of the module. As mentioned, in some embodiments, it will be desired to build a deck or entryway into some or all of a module. In these cases, there may be a roof assembly or the deck may be uncovered, with no roof assembly. It should be understood that the roof assembly may run the full length of the top plane, or may run along portions of the top plane, or may not run along the top plane of a module at all, depending on the relationship of the module to the other modules that will be adjoined to it at the site to form a habitable building.

Figure 7:
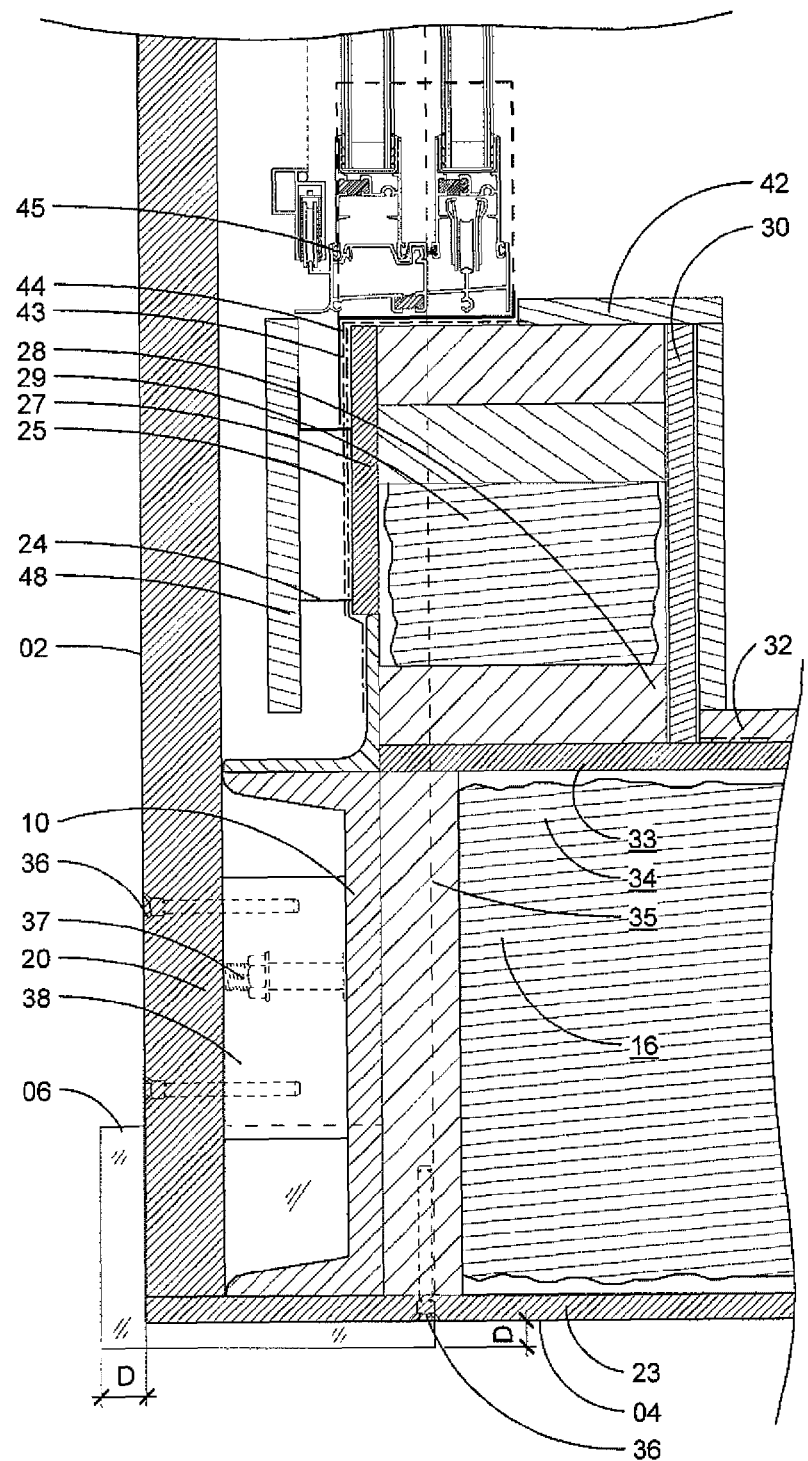
FIG. 7 is an enlarged cross-sectional view, taken substantially along the line 07 of FIG. 1.

FIG. 7 is a cross section view cutting through the sill of a window on the side wall of FBM 100, shown with the side and bottom transport panels 20, 23 attached. This preferred embodiment shows a similar condition to FIG. 5, but here with a fully complete window assembly installed in the finished wall assembly. FIG. 7 is to be paired with FIG. 8, which shows the same window at its head condition. In FIG. 7, exterior wood siding 48 is attached to perforated metal Z channels 24 which create an air gap and allows water that gets behind the exterior finish material to drain through perforations and find its way out of the wall cavity, as is standard practice in common "rain screen" assemblies. A waterproof membrane 25 is attached to plywood sheathing 27, which in turn is fastened to wood framing 28 that is filled with batt insulation 29 and has painted gypsum board 30 and a finish wood cap 42 attached to its interior face and forms a standard window sill upon which to fasten waterproofing 43 a sill pan 44, and a nail-on-flange window assembly 45. As in FIG. 5, alternate embodiments for the exterior finish materials, wall furring, framing, insulation, and interior finish are all to be considered. Also, windows can be of any sizes and type, such as sliding, casement, awning, fixed, block framed, wood, aluminum or vinyl, or, in other embodiments, can be door assemblies. In all cases, the principals remain the same: finished window and alternate assemblies are located such that their outermost face is set back to accommodate the attachment of side plane transport panels 20 such that the outside face 02 of the side plane transport panels 20 is set back from the outside faces of the lower corner fittings 06 at a minimum distance D required for the proper handling and securing of the corner fittings by standard load handling equipment for shipping containers. The floor assembly remains the same as in FIGS. 05-06. As with FIGs, 05-06, it should be understood that other variants of floor assembly are possible. This preferred embodiment articulates a window assembly or door assembly set into a wall assembly, though it should be understood that an alternate embodiment can be the window assembly or door assembly installed in place of a wall assembly.

Figure 8:
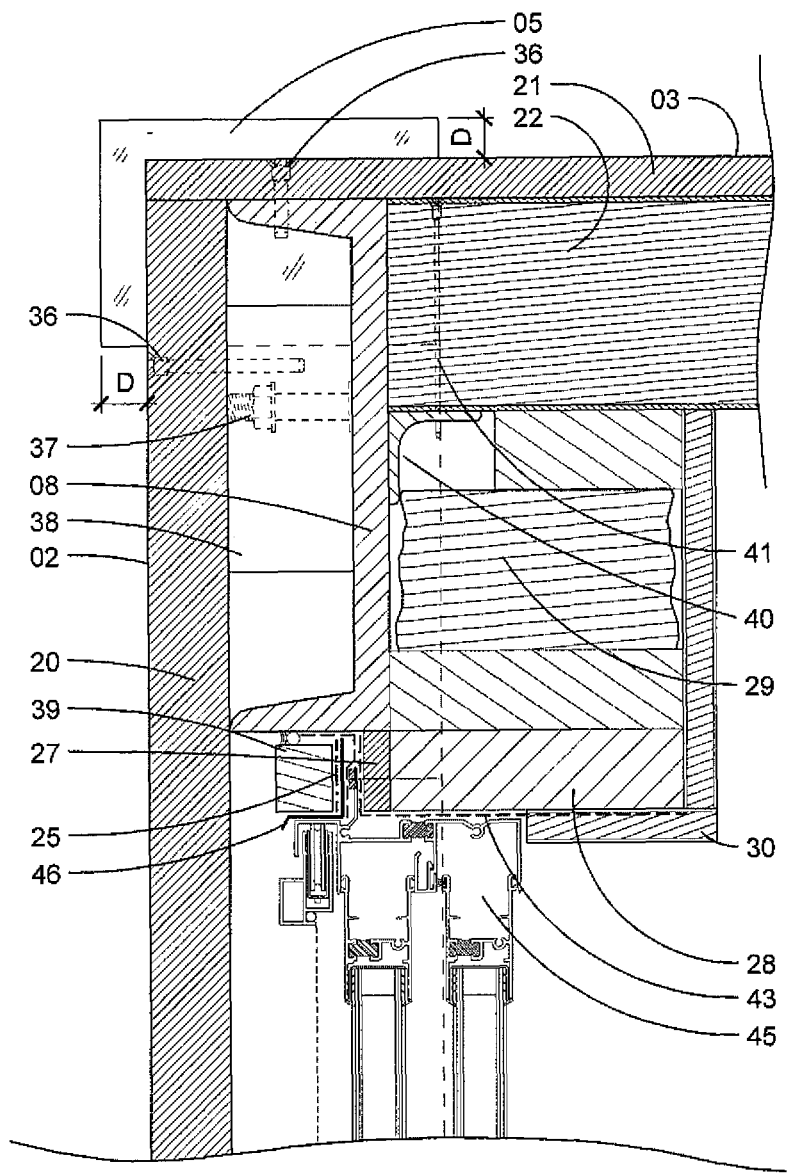
FIG. 8 is an enlarged cross-sectional view, taken substantially along the line 08 of FIG. 1.

FIG. 8 is a cross section view cutting through the head of a window on the side wall of FBM 100, shown with the side and top transport panels attached. This illustration shows the preferred embodiment of how the head of a window assembly is installed in the wall assembly as shown in FIGS. 5-6. FIG. 8 is to be paired with FIG. 7, which shows the same window at its sill condition. In FIG. 8, a wood trim piece 39 is attached to a waterproof membrane 25 and a metal drip piece 46, which in turn is attached to a nail-on flange window assembly 45 which in turn is attached to waterproofing 25, plywood sheathing 27 and the window-head frame 28 of the wood framed wall assembly which contains batt insulation 29 and has painted gypsum board applied to its interior surface 30. As in the other figures, alternate embodiments for the exterior finish materials, wall furring, framing, insulation, and interior finish are all to be considered. Also, windows can be of any sizes and type or, in other embodiments, can be door assemblies. In all cases, the principals remain the same: finished window and alternate assemblies are located such that their outermost face is set back to accommodate side plane transport panels 20 such that the outside face of the side plane transport panels 20 is set back from the outside faces of the top corner fittings 05 at a minimum distance D required for the proper handling and securing of the corner fittings by standard load handling equipment for shipping containers. FIG. 8 shows the same embodied version of the finished roof assembly as in FIG. 6. As with FIG. 6, it should be understood that other variants of the roof assembly are possible.

Figure 9:
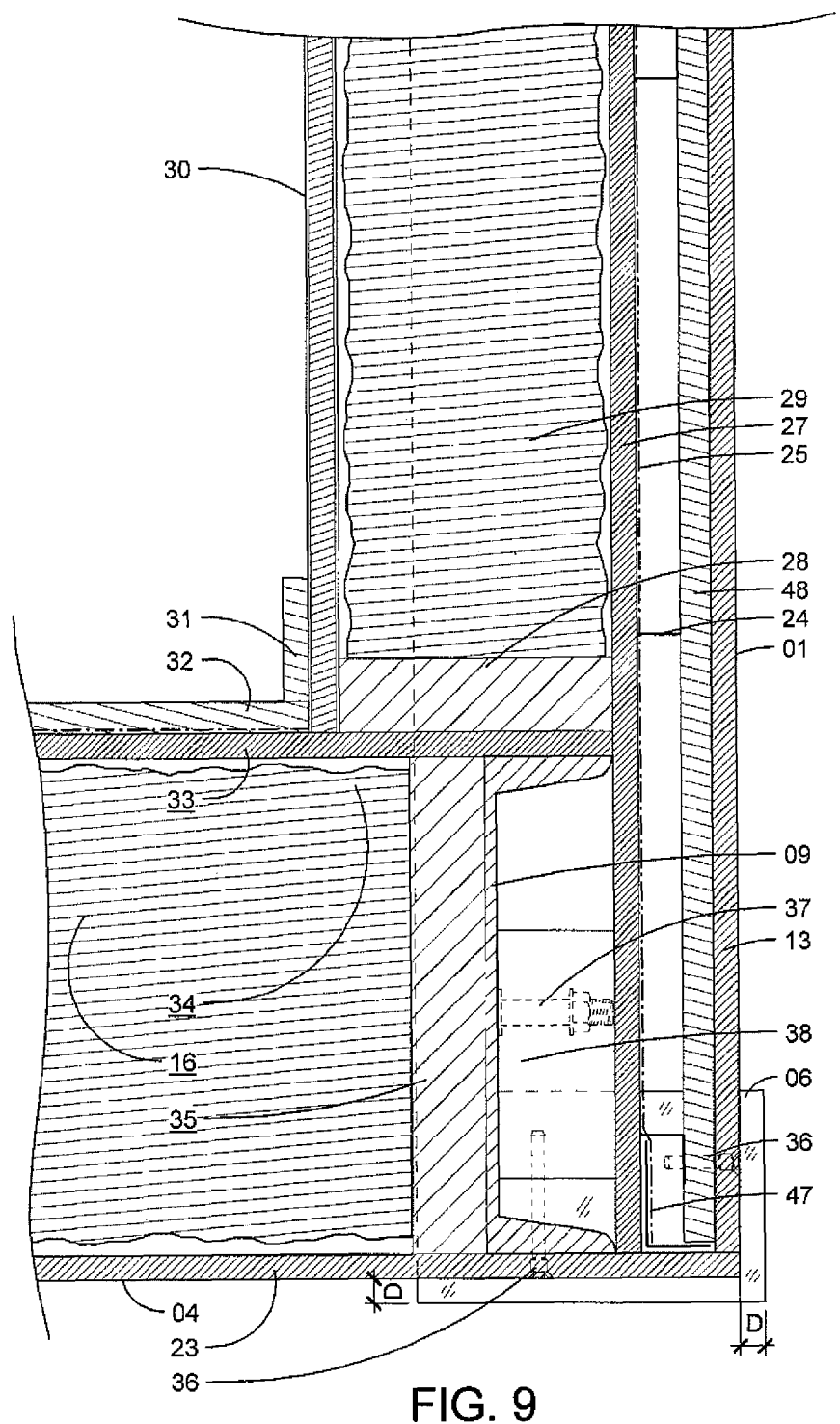
FIG. 9 is an enlarged cross-sectional view, taken substantially along the line 09 of FIG. 1.
Figure 10:
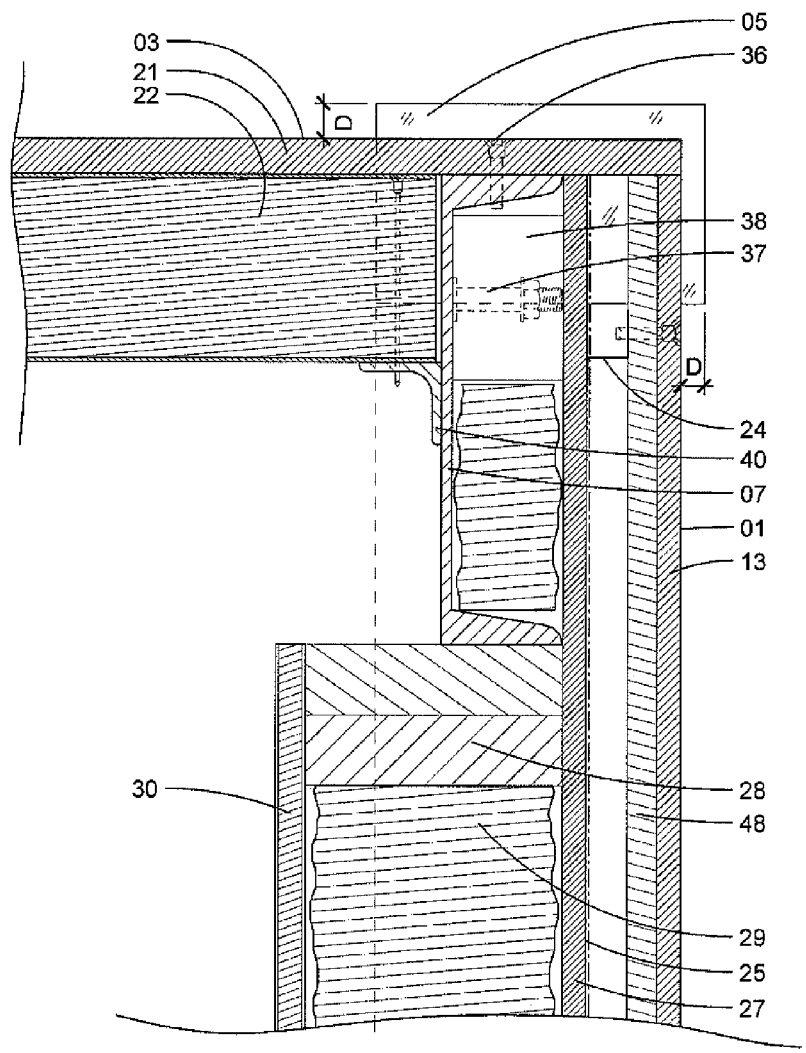
FIG. 10 is an enlarged cross-sectional view, taken substantially along the line 10 of FIG. 1.

FIG. 9 is a cross section view cutting through the base of the end wall of FBM 100, shown with the end and bottom transport panels 13, 23 attached using connecting element 36. This illustration shows one of the preferred embodiments for the bottom of a finished wall assembly along the end walls of the FBM 100. FIG. 9 is to be paired with FIG. 10, which shows the same wall at its top condition. Unlike in the embodiment shown along the side walls, the end wall embodiment has the finished wall assembly concealing the end bottom beam 09. In alternate embodiments, the floor beam is exposed. In the current embodiment, exterior wood siding 48 is attached to perforated metal Z channels 24 which create an air gap and allows water that gets behind the exterior finish material to drain through perforations and find its way out of the wall cavity, as is standard practice in common "rain screen" assemblies. A waterproof membrane 25 and a metal drip at the base of the wall 47 are attached to plywood sheathing 27, which in turn is fastened at the base to wood blocking 38 that is supported by a threaded bolt 37 welded to the floor beam 09. Above the bottom beam 09, the plywood sheathing 27 is fastened to wood framing 28 that is filled with batt insulation 29 and has painted gypsum board 30 attached to its interior face. A baseboard 31 is installed to conceal the joint between the floor and wall assembly. The sum total of these pieces constitutes the bottom portion of a fully finished wall assembly. This wall assembly is located such that its outermost face is set back to accommodate the attachment of end plane transport panels 13 such that the outside face 01 of the end plane transport panels 13 is set back from the outside faces of the bottom corner fittings 06 at a minimum distance D required for the proper handling and securing of the corner fittings by standard load handling equipment for shipping containers. As in FIGS. 05-08, alternate embodiments for the exterior finish materials, wall furring, framing, insulation, and interior finish are all to be considered. In the current embodiment, the end plane transport panel 13 is fastened through the exterior finish material to a Z channel 24 that is then attached to plywood sheathing 27 that is in turn fastened to wood blocking 38, supported by a threaded bolt 37 welded to the end bottom beam 09. In other embodiments, end plane transport panel attachment may be handled differently; for example, if the end bottom beam skeletal members 09 are tube steel beams, the end plane transport panels may be fastened directly to the beams. The floor assembly remains the tangibly the same as in FIGS. 05, 07. It should be understood that the wall assembly may run the full length of the end planes, or may run along portions of the end planes, or may not run along the end planes of a module at all, depending on the relationship of the module to the other modules that will be adjoined to it at the site to form the habitable building FIG. 10 is a cross section view cutting through the top of the end wall in FBM 100, shown with the end and top transport panels attached. This illustration shows one of the preferred embodiments for the top portion of a finished wall assembly along the end walls of the FBM 100. FIG. 10 is to be paired with FIG. 9, which shows the same wall at its lower condition. Unlike in the embodiment shown along the top of the side walls FIG. 7, the top end wall embodiment has the finished wall assembly concealing the top beam 07 of the skeletal frame. In alternate embodiments, skeletal top beam 07 is exposed. In the current embodiment, exterior wood siding 48 is attached to perforated metal Z channels 24 which create an air gap and allows water that gets behind the exterior finish material to drain through perforations and find its way out of the wall cavity, as is standard practice in common "rain screen" assemblies. A waterproof membrane 25 is attached to plywood sheathing 27, which in turn is fastened at the top to wood blocking 38 that is supported by a threaded bolt 37 welded to the roof beam 07, and fastened to wood framing 28 that is filled with batt insulation 29 and has painted gypsum board 30 attached to its interior face. Experts in the construction industry would agree that the sum total of these pieces constitutes the top portion of a fully finished wall assembly. This wall assembly is located such that its outermost face is set back to accommodate the attachment of end plane transport panels 13 such that the outside face 01 of the end plane transport panels 13 is set back from the outside faces of the upper corner fittings 05 at a minimum distance D required for the proper handling and securing of the corner fittings by standard load handling equipment for shipping containers. As in FIGS. 05-09, alternate embodiments for the exterior finish materials, wall furring, framing, insulation, and interior finish are all to be considered. In the current embodiment, the end plane transport panel 13 is fastened through the exterior finish material to a Z channel 24 that is then attached to wall sheathing 27 that is in turn fastened to wood blocking 38, supported by a threaded bolt 37 welded to the top beam 07. In other embodiments, end plane transport panel attachment may be handled differently; for example, if the top end horizontal skeletal members 07 are tube steel beams, the end plane transport panels may be fastened directly to the beams. The roof assembly remains the tangibly the same as in FIGS. 6, 8.

Figure 11:
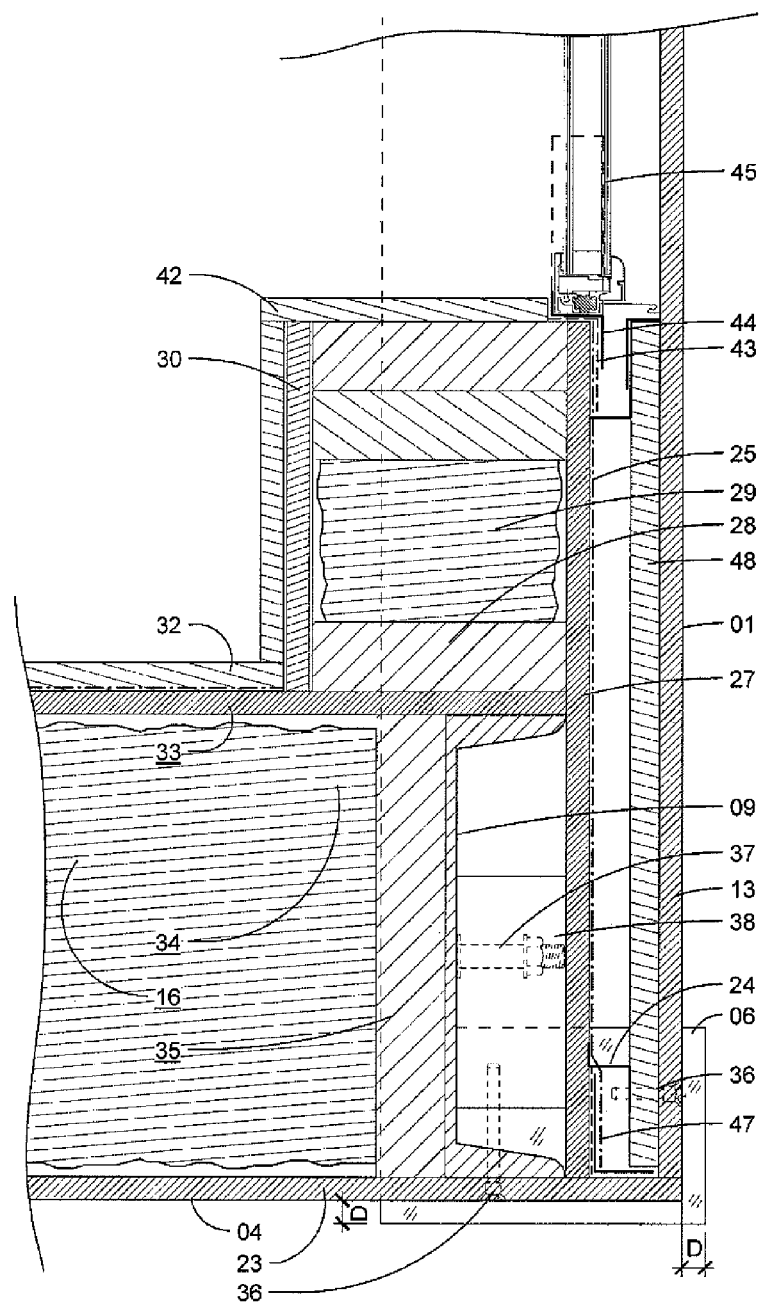
FIG. 11 is an enlarged cross-sectional view, taken substantially along the line 11 of FIG. 1.

FIG. 11 is a cross section view cutting through the sill of a window on the side wall of FBM 100, shown with the end and bottom transport panels 13, 23 attached. This preferred embodiment shows a similar condition to FIG. 9, but here with a fully complete window assembly installed in the finished wall assembly. FIG. 11 is to be paired with FIG. 12, which shows the same window at its head condition. In FIG. 11, exterior wood siding 48 is attached to perforated metal Z channels 24 which create an air gap and allows water that gets behind the exterior finish material to drain through perforations and find its way out of the wall cavity, as is standard practice in common "rain screen" assemblies. A waterproof membrane 25 with a metal drip at the base of the wall 47 is attached to plywood sheathing 27, which in turn is fastened to wood framing 28 that is filled with batt insulation 29 and has painted gypsum board 30 and a finish wood cap 42 attached to its interior face and forms a standard window sill upon which to fasten waterproofing 43 a sill pan 44, and a nail-on-flange window assembly 45. As in FIG. 7, in FIG. 11 windows can be of any sizes and type, such as sliding, casement, awning, fixed, block framed, wood, aluminum or vinyl, or, in other embodiments, can be door assemblies. Also, as in FIGS. 5-10, alternate embodiments for the exterior finish materials, wall furring, framing, insulation, and interior finish are all to be considered. In all embodiments, the principals remain the same: finished window and alternate assemblies are located such that their outermost face is set back to accommodate the attachment of end plane transport panels 13 such that the outside face 01 of the end plane transport panels 13 is set back from the outside faces of the lower corner fittings 06 at a minimum distance D required for the proper handling and securing of the corner fittings by standard load handling equipment for shipping containers. The floor assembly remains the same as in FIGS. 5, 7, 9.

Figure 12:
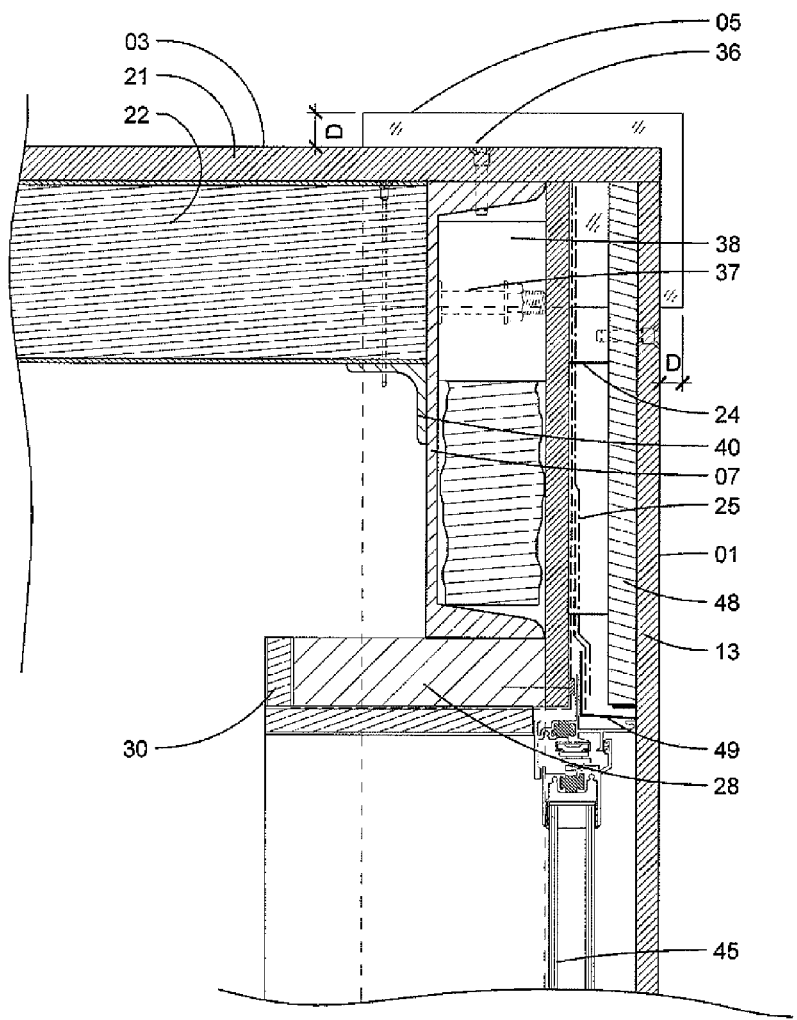
FIG. 12 is an enlarged cross-sectional view, taken substantially along the line 12 of FIG. 1.

FIG. 12 is a cross section view cutting through the head of a window on the side wall of FBM 100, shown with the end and top transport panels 21, 13 attached. This illustration shows the preferred embodiment of how the head of a window assembly is installed in the finished wall assembly shown in FIGS. 9-10. FIG. 12 is to be paired with FIG. 11, which shows the same window at its sill condition. In FIG. 12, exterior wood siding 48 is attached to perforated metal Z channels 24 which create an air gap and allows water that gets behind the exterior finish material to drain through perforations and find its way out of the wall cavity, as is standard practice in common "rain screen" assemblies. A waterproof membrane 25 is attached to plywood sheathing 27, which in turn is fastened to a piece of wall framing 28 that has painted gypsum board 30 attached to its interior face and forms an opening upon which to fasten waterproofing 25 lapped over a nail-on flange window assembly 45. As in FIG. 5, alternate embodiments for the exterior finish materials, wall furring, framing, insulation, and interior finish are all to be considered. Also, windows can be of any sizes and type or, in other embodiments, can be door assemblies. In all cases, the principals remain the same: finished window and alternate assemblies are located such that their outermost face is set back to accommodate end plane transport panels 13 such that the outside face 01 of the end plane transport panels 13 is set back from the outside faces of the top corner fittings 05 at a minimum distance D required for the proper handling and securing of the corner fittings by standard load handling equipment for shipping containers. As in the other figures, alternate embodiments for the exterior finish materials, wall furring, framing, insulation, and interior finish are all to be considered. The roof assembly remains the tangibly the same as in FIGS. 6, 8, 10.

Figure 13:
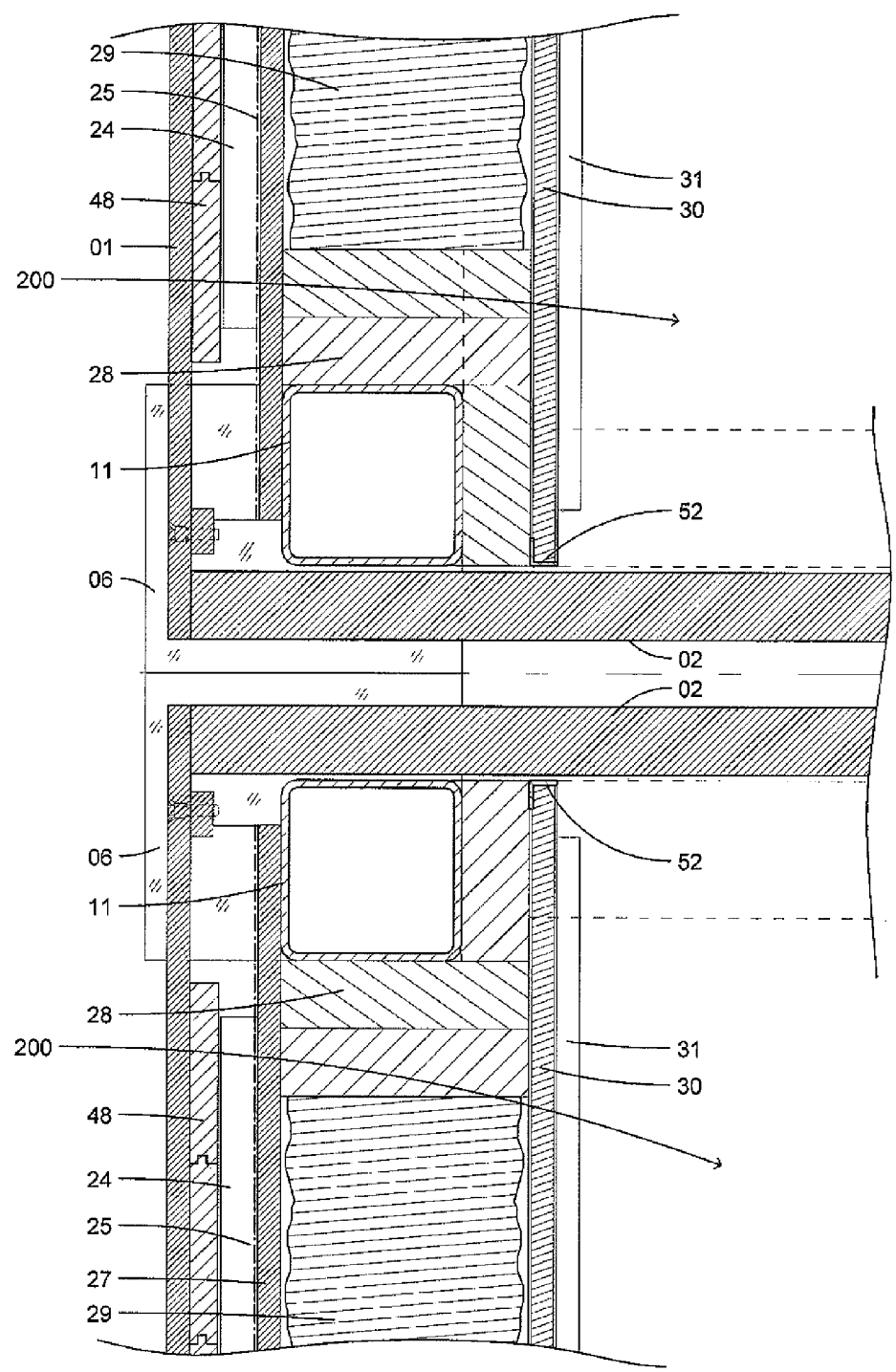
FIG. 13 is an enlarged plan view, taken substantially along the line 13 of FIG. 2.
Figure 14:
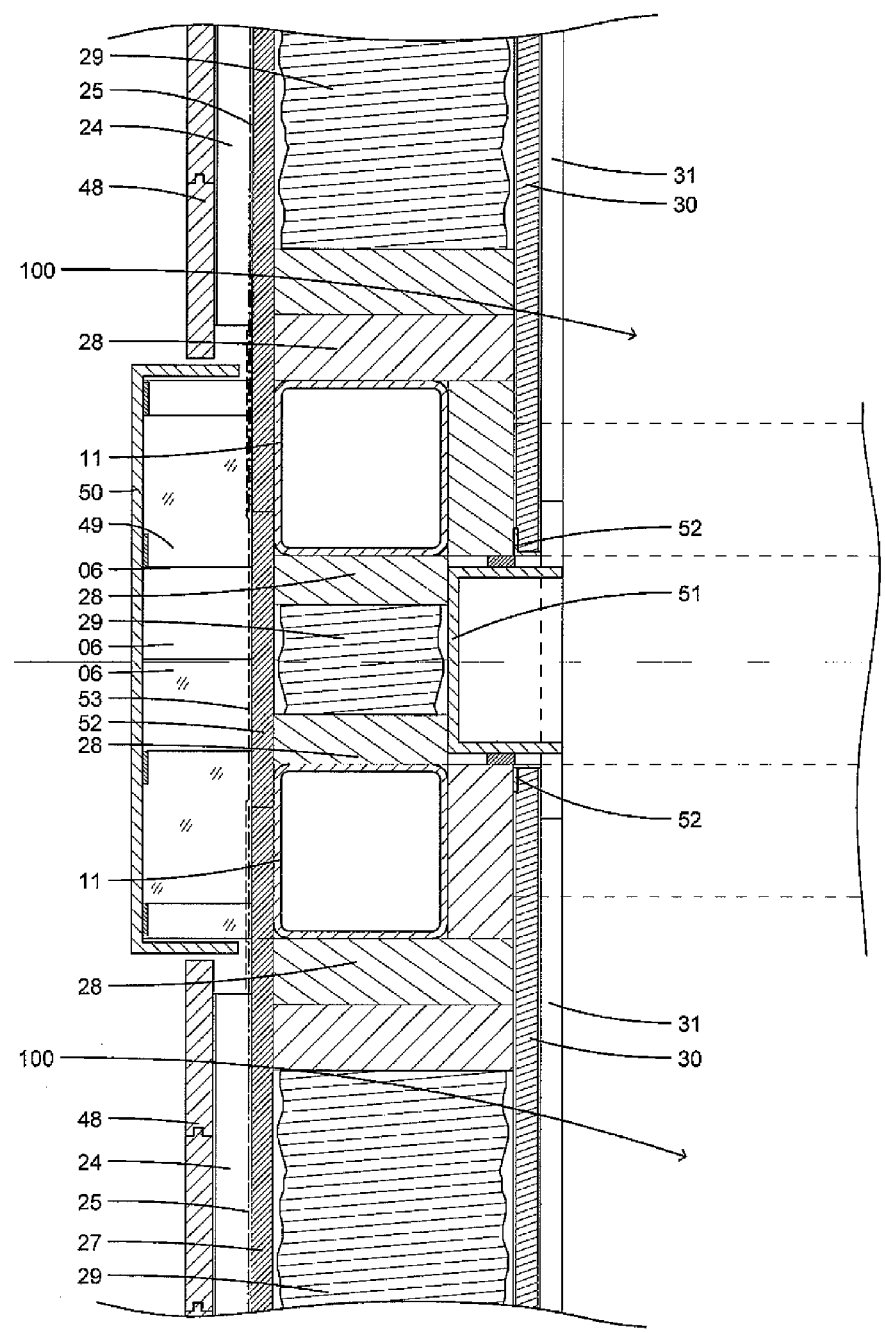
FIG. 14 is an enlarged plan view, taken substantially along the line 14 of FIG. 1.

FIG. 13 is a plan view cutting the corner of the end wall of two adjacent FBM 200 modules. The joint between modules is designed such that interior and exterior finish materials and assemblies can be fully installed in a factory, protected during shipment, and completed onsite by adding a standardized cover plate 50 to the exterior wall assembly and to interior wall assembly 51. On the exterior, the siding 48 is held back from the edge of the module, allowing easy access to the joint between modules once onsite. FIG. 14 is a plan view cutting through the same wall as FIG. 13, but here it is shown without transport panels and after site installation. Before installing the finish exterior module cover plate 50, the design allows easy access onsite to the module-to-module joint, where in most cases insulation is added 29, and a strip of sheathing 52, and module line waterproofing 53, and the exterior joint is capped with a standardized cover plate 50. On the interior in FIG. 13, the drywall finish 30 is fully installed in the factory and is held back by angles 52. The drywall can be fully finished and painted in the factory, leaving no further work onsite. Once onsite, as shown in FIG. 14, a standardized interior cover plate 51 is installed to cover over the seam between the interior walls and to finish the interior of the building. While the preferred embodiment shows drywall on the interior and metal on the exterior, it should be understood that the same system of cover plates can be used with any combination of interior and exterior finish materials. In the preferred embodiment the exterior cover plate is metal and the interior cover plate is medium density fiberboard.

Figure 15:
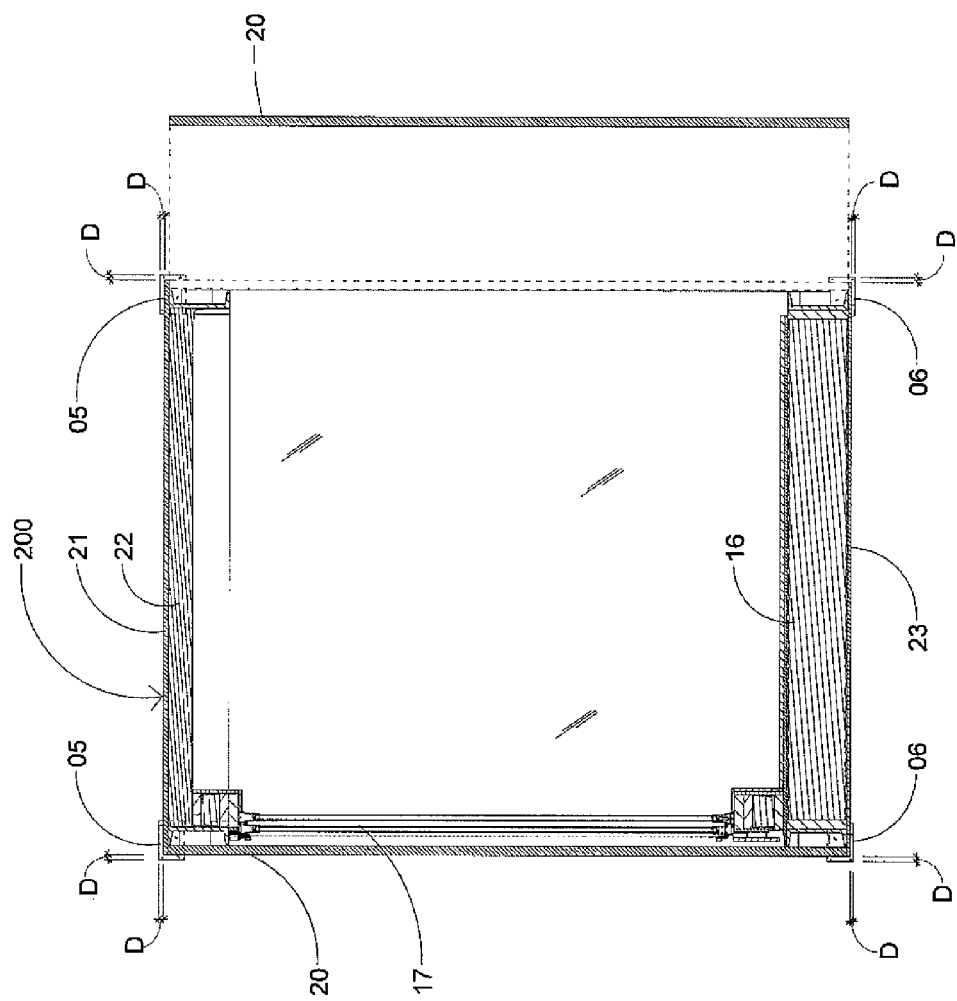
FIG. 15 is an enlarged cross-sectional view, taken substantially along the line 15 of FIG. 1 and FIG. 2.

FIG. 15 is a cross section view cutting through an embodiment of an FBM 200 module, shown with the side, top, and bottom transport panels attached 20, 21, and 23. Dashed lines depict one side transport panel 20 in the process of being removed from the FBM 200 assembly. This view shows the relationship, along the transverse side of the module, of the exterior faces of the top and bottom corner fittings 05, 06 with the transportation panels, as defined by D, which represents the minimum distance required for the proper handling and securing of the corner fittings by standard load handling equipment for shipping containers. The view also shows how the floor assembly 16, the window assembly 17, and the roof assembly 22, are all set back from the perimeter of the module to accommodate the protection panels 23, 20, 21 so that distance D can be maintained in all situations.

Figure 16:
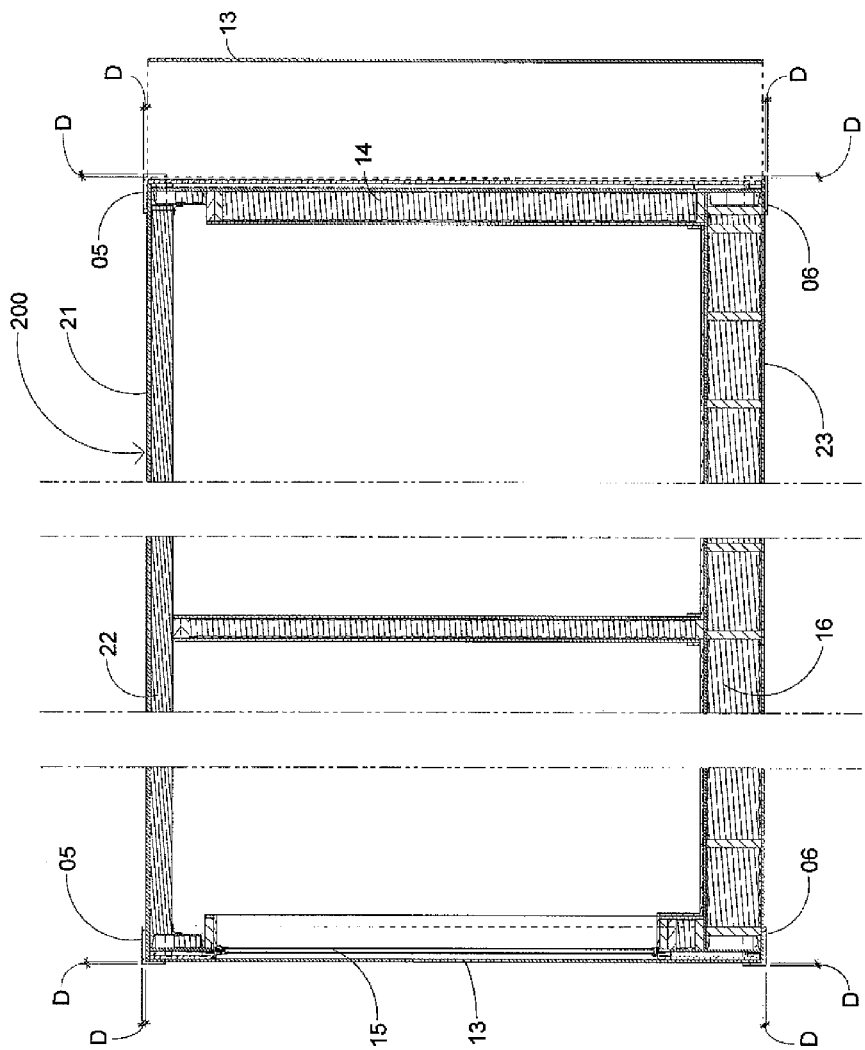
FIG. 16 is an enlarged cross-sectional view, taken substantially along the line 16 of FIG. 1 and FIG. 2.

FIG. 16 is a cross section view cutting through an embodiment of an FBM 200 module, shown with the end, top, and bottom transport panels attached 13, 21, 23. Dashed lines depict one end transport panel 13 in the process of being removed from the FBM 200 assembly. This view shows the relationship, along the longitudinal side of the module, of the exterior faces of the top and bottom corner fittings 05, 06 with the transportation panels 13, 21, 23, as defined by D, which represents the minimum distance required for the proper handling and securing of the corner fittings by standard load handling equipment for shipping containers. The view also shows how the floor assembly 16, the end wall window assembly 15, the end wall assembly 14 and the roof assembly 22, are all set back from the perimeter of the module to accommodate the protection panels 23, 13, 21 so that distance D can be maintained in all situations.

Figure 17:
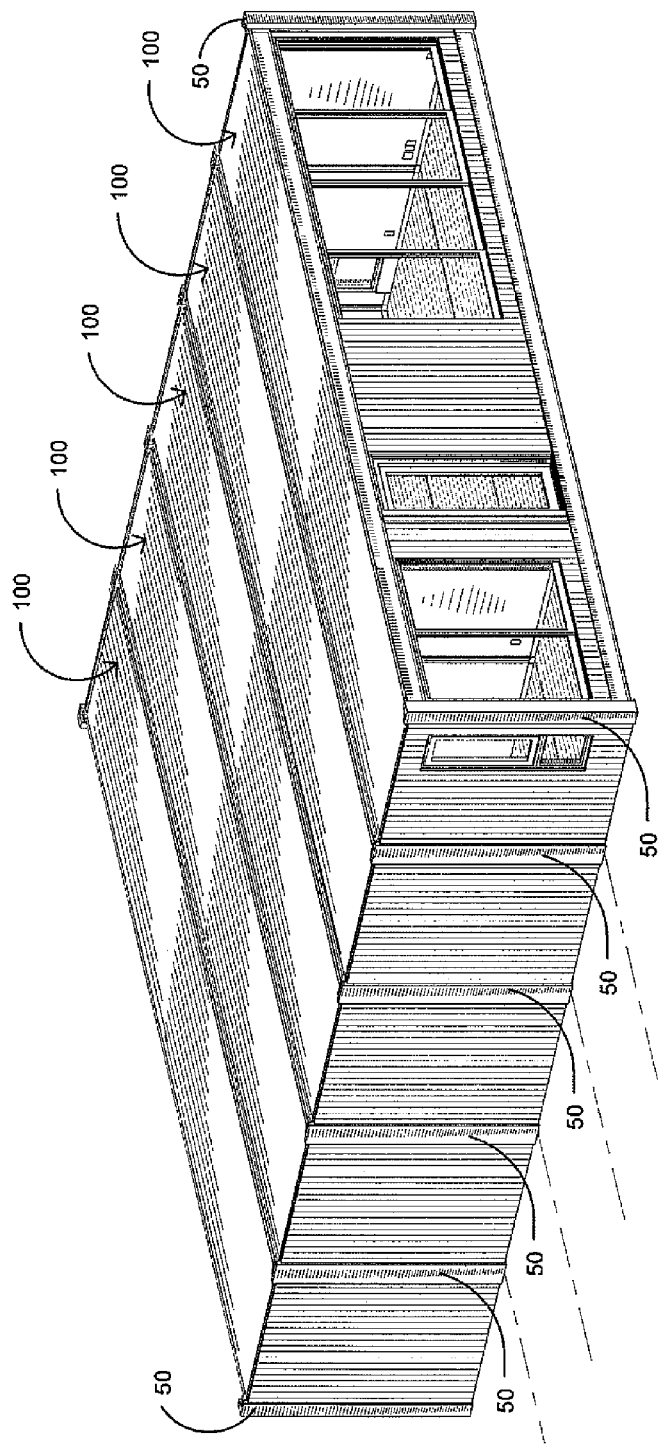
FIG. 17 is a perspective view of a preferred embodiment of a one-story house formed from multiple FBM joined together on the building site.

FIG. 17 is a perspective view of a preferred embodiment of a completed one-story house formed from multiple FBM 100 joined together on the building site. In this embodiment, the only visible element added onsite are cover plates 50 that cover the sealed joint between modules and the top and bottom corner fittings 05, 06. It should be understood that there are countless different arrangements and combinations of FBM 100 that can be made into habitable space of all types, appearances, and configurations.

Figure 18:
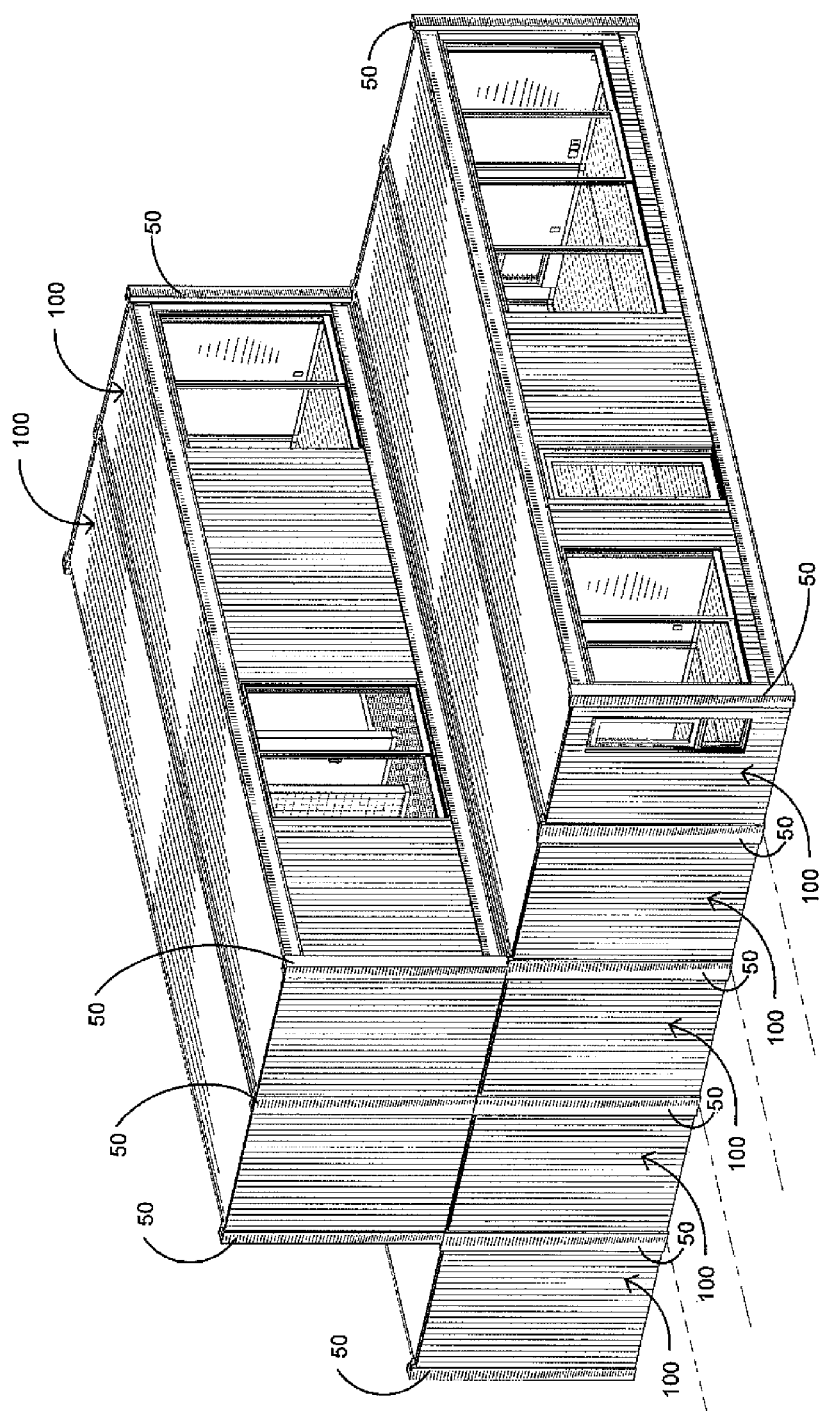
FIG. 18 is a perspective view of a preferred embodiment of a two-story house formed from multiple FBM joined together on the building site.

FIG. 18 is a perspective view of a preferred embodiment of a completed two-story house formed from multiple FBM 100 joined together on the building site. In this embodiment, the only visible element added onsite are cover plates 50 that cover the sealed joint between modules and the top and bottom corner fittings 05, 06. It should be understood that there are countless different arrangements and combinations of FBM 100 that can be made into buildings of all types, appearances, and configurations, and that FBM 100's can be stacked to make buildings of one, two, three, four or even more stories.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A finished building module for modular construction comprising:
   two vertical side planes arranged parallel to and at a distance from each other;
   two vertical end planes arranged parallel to and at a distance from each and substantially perpendicular to the two vertical side planes;
   a top horizontal plane arranged at an upper end of the vertical side planes;
   a bottom plane arranged at a lower end of the vertical side planes, the bottom plane substantially perpendicular to the vertical side planes; and
   eight corner fittings configured for handling and securing of the building module, each of the corner fittings arranged at an intersection of three of the planes, each corner fitting comprising:
      an outer first face substantially parallel to the bottom plane;
      an outer second face substantially parallel to the side planes;
      an outer third face substantially parallel to the end planes;
   a plurality of removably attached transport panels configured to be arranged on the top plane, side planes and the end planes, wherein respective outside faces of the plural transport panels are arranged inboard of respective outer faces of the corner fittings along the side, end, top, and bottom planes at least a minimum distance required for handling and securing of the corner fittings by standard load handling equipment for shipping containers;
   at least one fixed wall assembly separate from the removeable transport panels and arranged at least partially at one or more of the two vertical side planes and the two vertical end planes such that an outside wall face of each fixed wall assembly is inboard of a respective removeable transport panel,
   wherein the corner fittings are arranged such that:
      a module vertical dimension between the outer first faces of the corner fittings along the top plane and the bottom plane substantially matches a standard vertical dimension required for positioning of corner fittings for a shipping container, a first horizontal dimension between the second outer faces of the corner fittings along one side plane and the second outer faces of the corner fittings along the opposite side plane substantially matches a standard dimension required for a horizontal positioning of corner fittings for a shipping container, and a second horizontal dimension between the third outer faces of the corner fittings along one end plane and the third face of the corner fittings along the opposite end plane substantially matches a standard dimension required for a longitudinal positioning of corner fittings for a shipping container.

2. The finished building module for modular construction according to claim 1, wherein each wall assembly comprises:
exterior cladding arranged at the outside wall face;
waterproofing arranged on an inside of the exterior cladding;
sheathing arranged on an inside of the waterproofing;
an interior finish surface; and
insulation arranged between the exterior cladding and interior finish surface.

3. The finished building module for modular construction according to claim 1, wherein each wall assembly comprises:
an exterior finish arranged at the outside wall face;
an interior finish surface; and
insulation arranged between the exterior finish surface and interior finish surface,
wherein the exterior finish and the interior finish are one of the same and different.

4. The finished building module for modular construction according to claim 1, further comprising:
four vertical bearing members, each vertical bearing member arranged inboard of respective second and third outer faces of respective corner fittings at an intersection of a respective end plane and a respective side plane at a distance at least equal to a width of one of the plural transport panels; and
four horizontal top bearing members, each horizontal top bearing member arranged inboard of respective outer first faces of respective corner fittings at an intersection of the top plane and a respective side plane and end plane at the distance at least equal to the width of a one of the plural transport panels; and
four horizontal bottom bearing members, each horizontal bottom bearing member arranged inboard of a respective outer first faces of respective corner fittings at an intersection of the bottom plane and a respective side plane and end plane at the distance at least equal to the width of a one of the plural transport panels.

5. The finished building module for modular construction according to claim 4, wherein each of the plural transport panels is configured to be removably attached to at least one of the vertical bearing members, the horizontal top bearing members, and the horizontal bottom bearing members.

6. The finished building module for modular construction according to claim 5, wherein after the finished building module is transported to a building site, the plural transport panels are removed from the finished building module, the module configured to be arranged on a support to form at least a portion of a habitable building.

7. The finished building module for modular construction according to claim 5, wherein the plural transport panels are at least one of metal, sheet metal, corrugated metal, stamped metal, wood, plywood, marine plywood, tongue and groove materials, composite materials, structurally insulated panels, sandwiched foam panels, foam, fiberglass, plastic, glass, gypsum, cement, fiber cement, concrete, tile, canvas, fabric and stone.

8. The finished building module for modular construction according to claim 1, further comprising:
at least one of:
a first exterior window assembly arranged in a respective wall assembly, wherein an outside face of the first exterior window assembly is arranged inboard of an inside face of a respective one or more of the plural transport panels arranged to cover the first exterior window assembly,
a second exterior window assembly, wherein an outside face of the second exterior window assembly is arranged inboard of an inside face of a respective one or more of the plural transport panels arranged to cover the second exterior window assembly,
a first door assembly arranged in a respective wall assembly, wherein an outside face of the door assembly is arranged inboard of the inside face of a respective one or more of the plural transport panels arranged to cover the door assembly, and
a second door assembly, wherein an outside face of the door assembly is arranged inboard of the inside face of a respective one or more of the plural transport panels arranged to cover the door assembly.

9. The finished building module for modular construction according to claim 8, wherein at least one of the two end planes and the two side planes is one of free or partially free of a respective wall assembly.

10. The finished building module for modular construction according to claim 8, further comprising a cover plate configured to be fastened at a regular gap where the finished building module and an adjacent building module are joined, whereby the cover plate conceals misalignment between adjacent modules.

11. The finished building module for modular construction according to claim 8, wherein the finished module is configured to be stacked with one or more modules to form a multi-storied habitable building.

12. The finished building module for modular construction according to claim 1, further comprising:
a roof assembly arranged at least partially at the top horizontal plane, an outside face of the roof assembly arranged inboard of the inside face of the respective one or more of the plural transport panels, the roof assembly comprising:
a top waterproof surface arranged at the outside face of the roof assembly;
an interior finish surface; and
insulation arranged between the top waterproof surface and the interior finish.

13. The finished building module for modular construction according to claim 12, further comprising:
a floor assembly arranged at least partially at the bottom horizontal plane, an outside face of the floor assembly arranged inboard of respective first faces of the corner fittings.

14. The finished building module for modular construction according to claim 1, further comprising one or more interior element configured as:
an interior wall partition;
an interior door;
casework;
a plumbing device and component;
an electrical device and component;

a mechanical device and component,
wherein the one or more interior elements are arranged inboard from the plural transport panels.

15. The finished building module for modular construction according to claim 1, wherein the finished building module is configured to be transported by at least an intermodal transport network.

16. A finished building module for modular construction comprising:
   two vertical side planes arranged parallel to and at a distance from each other;
   two vertical end planes arranged parallel to and at a distance from each and substantially perpendicular to the two vertical side planes;
   a top horizontal plane arranged at an upper end of the vertical side planes;
   a bottom plane arranged at a lower end of the vertical side planes, the bottom plane substantially perpendicular to the vertical side planes; and
   eight corner fittings configured for handling and securing of the building module, each of the corner fittings arranged at an intersection of three planes, each corner fitting comprising:
      an outer first face substantially parallel to the bottom plane;
      an outer second face substantially parallel to the side planes;
      an outer third face substantially parallel to the end planes;
   a plurality of removably attached transport panels configured to be arranged at the top plane, the side planes, and the end planes, wherein respective outside faces of the plural transport panels are arranged inboard of respective outer faces of the corner fittings at least a minimum distance required for handling and securing of the corner fittings by standard load handling equipment for shipping containers;
   four vertical bearing members, each vertical bearing member arranged inboard of a respective outer faces of respective corner fittings at an intersection of a respective end plane and a respective side plane at a distance at least equal to a width of a one of the plural transport panels; and
   four horizontal top bearing members, each horizontal top bearing member arranged inboard of a respective outer faces of respective corner fittings at an intersection of the top plane and a respective side plane and a respective end plane at the distance at least equal to the width of a one of the plural transport panels; and
   four horizontal bottom bearing members, each horizontal bottom bearing member arranged inboard of a respective outer faces of respective corner fittings at an intersection of the bottom plane and a respective side plane and a respective end plane at the distance at least equal to the width of a one of the plural transport panels,
   wherein the corner fittings are arranged such that:
      a module vertical dimension between the first outer faces of the corner fittings along the top plane and the bottom plane substantially matches a standard vertical dimension required for positioning of corner fittings for a shipping container,
      a first horizontal dimension between the second outer faces of the corner fittings along one side plane and the second faces of the corner fittings along the opposite side plane substantially matches a dimension required for a horizontal positioning of corner fittings for a shipping container,
      a second horizontal dimension between the third outer faces of the corner fittings along one end plane and the third face of the corner fittings along the opposite end plane substantially matches a dimension required for a longitudinal positioning of corner fittings for a shipping container; and
   at least fixed one wall assembly separate from the removeable transport panel and arranged at one or more of the two vertical side planes and each of the two vertical end planes such that an outside wall face of each wall assembly is inboard of a respective removeable transport panel.

17. The finished building module for modular construction according to claim 16, further comprising:
   at least one of:
      a floor assembly arranged at least partially at the bottom horizontal plane, an outside face of the floor assembly arranged inboard of the inner face of the respective one or more of the plural transport panels,
      a roof assembly arranged at least partially at the top horizontal plane, an outside face of the roof assembly arranged inboard of the inside face of the respective one or more of the plural transport panels,
      an first exterior window assembly arranged in a respective wall assembly, wherein an outside face of the first exterior window assembly is arranged inboard of an inside face of the respective one or more of the plural transport panels arranged to cover the first exterior window assembly,
      an second exterior window assembly, wherein an outside face of the second exterior window assembly is arranged inboard of an inside face of the respective one or more of the plural transport panels arranged to cover the second exterior window assembly,
      a first door assembly arranged in a respective wall assembly, wherein an outside face of the door assembly is arranged inboard of the inside face of the respective one or more of the plural transport panels arranged to cover the door assembly, and
      a second door assembly, wherein an outside face of the door assembly is arranged inboard of the inside face of the respective one or more of the plural transport panels arranged to cover the door assembly.

18. The finished building module for modular construction according to claim 17, wherein the plural transport panels are at least one of metal, sheet metal, corrugated metal, stamped metal, wood, plywood, marine plywood, tongue and groove materials, composite materials, structurally insulated panels, sandwiched foam panels, foam, fiberglass, plastic, glass, gypsum, fiber cement, concrete, tile, canvas, fabric and stone.

19. A finished building module, comprising:
   a rectangular cuboid frame defining two vertical side planes, two vertical end planes, an upper plane, a lower plane, and eight corners, the frame comprising four upper horizontal beams forming an upper rectangle defining the upper plane, four lower horizontal beams forming a lower rectangle defining the lower plane, and four vertical beams connecting corners of the upper and lower rectangles defining the two vertical end planes and the two vertical side planes;
   eight corner fittings respectively arranged at the eight corners of the rectangular cuboid frame, each corner fitting comprising an outer first face substantially parallel to the bottom plane, an outer second face substantially parallel to the side planes, and an outer third face substantially parallel to the end planes, the eight corner fittings being arranged and dimensioned to conform with a standard for shipping containers;
a plurality of removably attached transport panels configured to cover the upper plane, end planes and side planes to protect the building module during handling and transport; and
at least one of:
   a floor assembly connected to the lower rectangle and the plurality of removably attached transport panels further configured to cover the bottom plane to further protect the building module during handling and transport,
wherein exterior faces of the transport panels being arranged inboard of the outer faces of the corner fittings by a minimum distance required for handling and transport of shipping containers using intermodal transport systems, the finished building module being usable as a building module after removal of the plural transport panels at a building site; and
at least fixed one wall assembly separate from the removeable transport panel and arranged at one or more of the two vertical side planes and each of the two vertical end planes such that an outside wall face of each wall assembly is inboard of a respective removeable transport panel.

* * * * *